US012647692B2

(12) United States Patent
Gadiya et al.

(10) Patent No.: US 12,647,692 B2
(45) Date of Patent: Jun. 2, 2026

(54) FOVEATED IMAGING

(71) Applicant: QUALCOMM Incorporated, San Diego, CA (US)

(72) Inventors: Shrey Shailesh Gadiya, Bengaluru (IN); Saurabh Aggarwal, Bengaluru (IN); Abhijeet Dey, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 18/924,893

(22) Filed: Oct. 23, 2024

(65) Prior Publication Data

US 2026/0113545 A1     Apr. 23, 2026

(51) Int. Cl.
| | |
|---|---|
| *H04N 23/951* | (2023.01) |
| *G06V 10/25* | (2022.01) |
| *G06V 10/762* | (2022.01) |
| *H04N 23/61* | (2023.01) |

(52) U.S. Cl.
CPC ........... *H04N 23/951* (2023.01); *G06V 10/25* (2022.01); *G06V 10/762* (2022.01); *H04N 23/61* (2023.01)

(58) Field of Classification Search
CPC ...... H04N 23/951; H04N 23/61; G06V 10/25; G06V 10/762
USPC ........................................................ 382/103
See application file for complete search history.

(56) References Cited

U.S. PATENT DOCUMENTS

| | | | |
|---|---|---|---|
| 2009/0080695 A1* | 3/2009 | Yang ...................... | G06V 10/92 |
| | | | 382/103 |
| 2013/0070109 A1 | 3/2013 | Gove et al. | |
| 2019/0114804 A1 | 4/2019 | Sundaresan et al. | |
| 2019/0347501 A1 | 11/2019 | Kim et al. | |
| 2024/0071108 A1* | 2/2024 | Edwards ................ | G06V 40/20 |

FOREIGN PATENT DOCUMENTS

WO          2023163799 A1      8/2023

OTHER PUBLICATIONS

International Search Report and Written Opinion—PCT/US2025/047815—ISA/EPO—Jan. 13, 2026.

* cited by examiner

*Primary Examiner* — Xi Wang
(74) *Attorney, Agent, or Firm* — QUALCOMM Incorporated

(57) ABSTRACT

Systems and techniques are described herein for foveated imaging. For instance, a method for foveated imaging is provided. The method may include determining a first region of interest within a first image based on a gaze of a user relative to the first image; clustering pixels of the first image into a one or more clusters of pixels based on a comparison of one or more characteristics of pixels of the first image; identifying a cluster of pixels from among the one or more clusters of pixels based on an intersection over union of the first region of interest and the cluster of pixels; generating a second region of interest based on the first region of interest and the cluster of pixels; and capturing a second image based on the second region of interest.

20 Claims, 16 Drawing Sheets

400

Peripheral Region 406

Peripheral Region 404

ROI 402

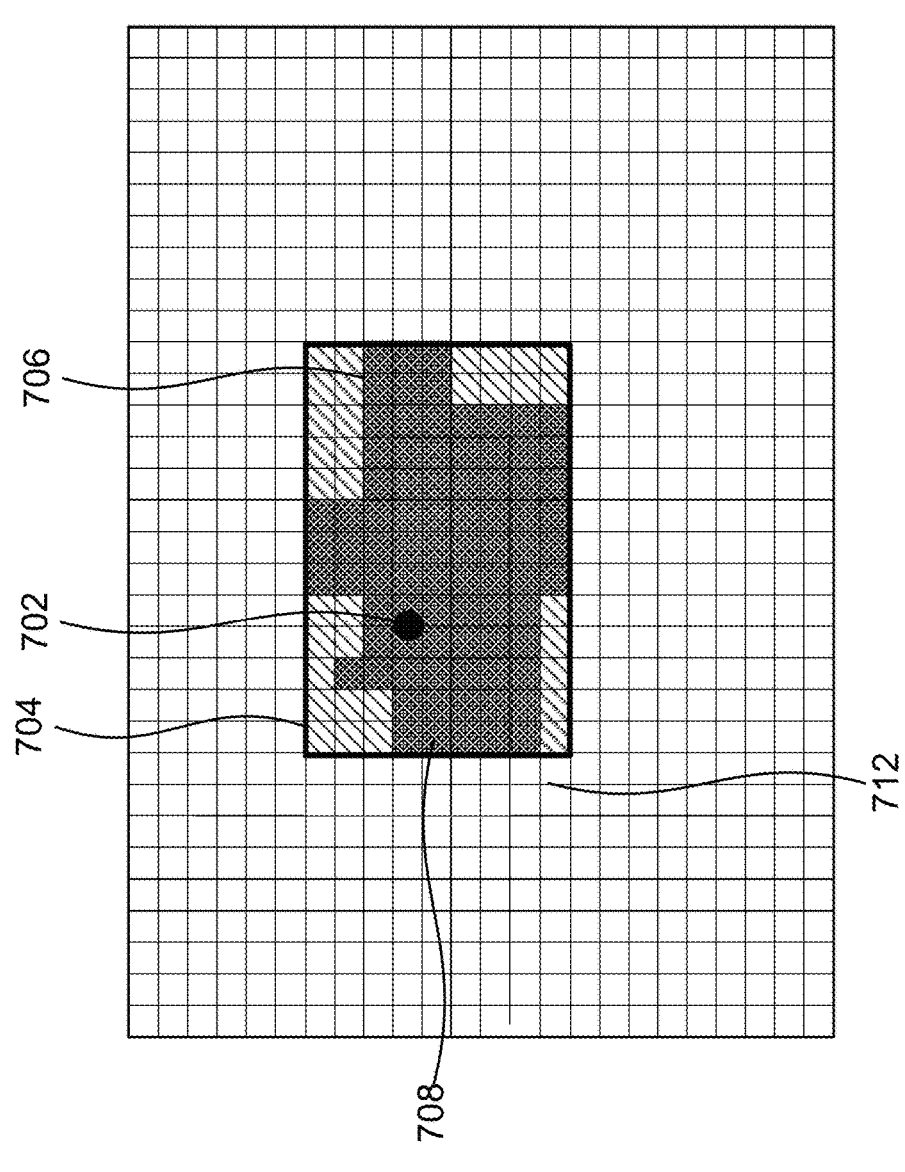
FIG. 7

Figure 12:
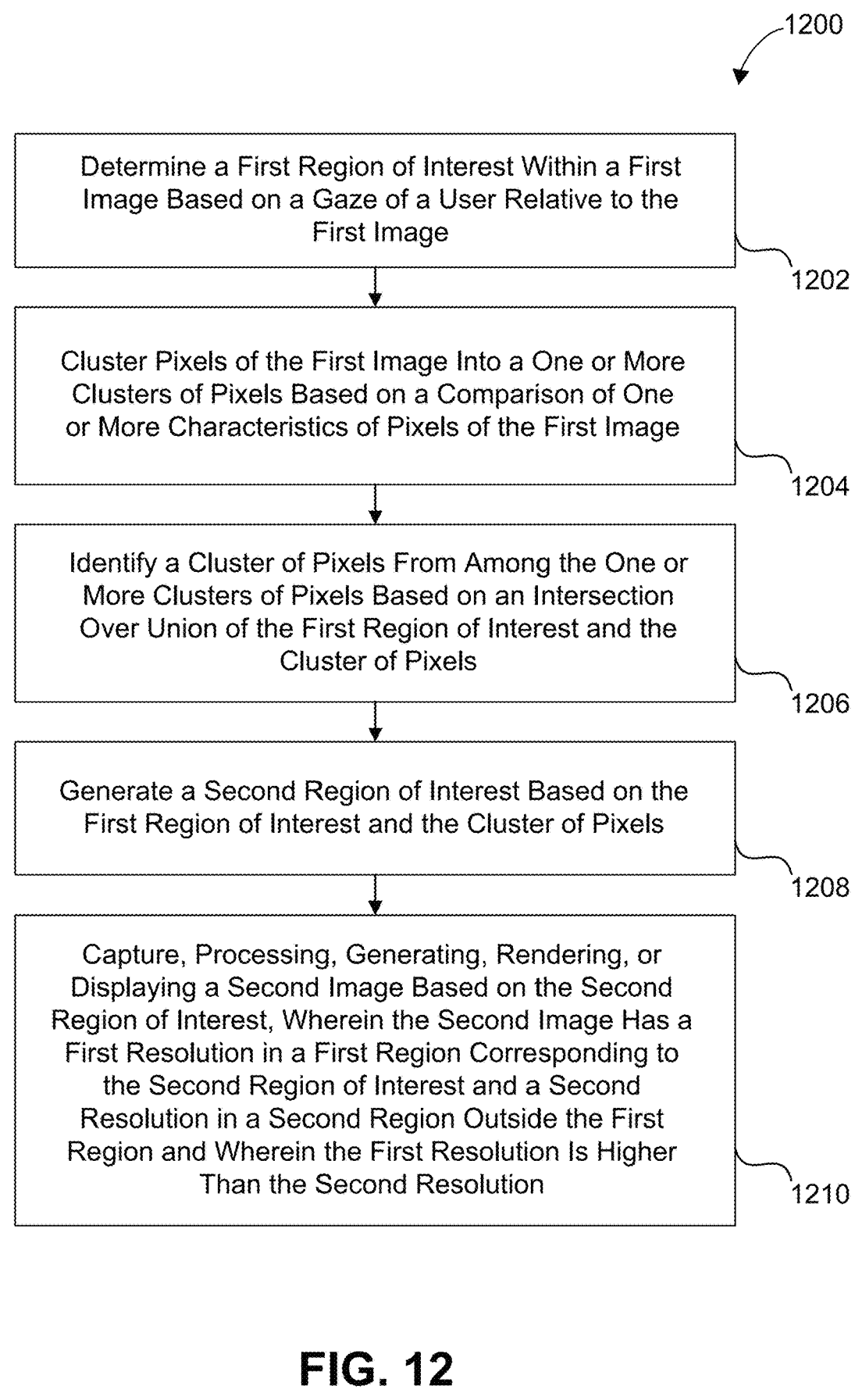

1200

Determine a First Region of Interest Within a First Image Based on a Gaze of a User Relative to the First Image

1202

Cluster Pixels of the First Image Into a One or More Clusters of Pixels Based on a Comparison of One or More Characteristics of Pixels of the First Image

1204

Identify a Cluster of Pixels From Among the One or More Clusters of Pixels Based on an Intersection Over Union of the First Region of Interest and the Cluster of Pixels

1206

Generate a Second Region of Interest Based on the First Region of Interest and the Cluster of Pixels

1208

Capture, Processing, Generating, Rendering, or Displaying a Second Image Based on the Second Region of Interest, Wherein the Second Image Has a First Resolution in a First Region Corresponding to the Second Region of Interest and a Second Resolution in a Second Region Outside the First Region and Wherein the First Resolution Is Higher Than the Second Resolution

FOVEATED IMAGING

TECHNICAL FIELD

The present disclosure generally relates to imaging. For example, aspects of the present disclosure include systems and techniques for foveated imaging.

BACKGROUND

Extended reality (XR) technologies can be used to present virtual content to users, and/or can combine real environments from the physical world and virtual environments to provide users with XR experiences. The term XR can encompass virtual reality (VR), augmented reality (AR), mixed reality (MR), and the like. XR systems can allow users to experience XR environments by overlaying virtual content onto a user's view of a real-world environment. For example, an XR head-mounted device (HMD) may include a display that allows a user to view the user's real-world environment through a display of the HMD (e.g., a transparent display). The XR HMD may display virtual content at the display in the user's field of view overlaying the user's view of their real-world environment. Such an implementation may be referred to as "see-through" XR. As another example, an XR HMD may include a scene-facing camera that may capture images of the user's real-world environment. The XR HMD may modify or augment the images (e.g., adding virtual content) and display the modified images to the user. Such an implementation may be referred to as "pass through" XR or as "video see through (VST)." The user can generally change their view of the environment interactively, for example by tilting or moving the XR HMD.

A foveated image is an image with different resolutions in different regions within the image. For example, a foveated image may include a highest resolution in a region of interest (ROI) and one or more lower-resolution regions around the ROI (e.g., in one or more "peripheral regions").

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for foveated imaging. According to at least one example, a method is provided for foveated imaging. The method includes: determining a first region of interest within a first image based on a gaze of a user relative to the first image; clustering pixels of the first image into a one or more clusters of pixels based on a comparison of one or more characteristics of pixels of the first image; identifying a cluster of pixels from among the one or more clusters of pixels based on an intersection over union of the first region of interest and the cluster of pixels; generating a second region of interest based on the first region of interest and the cluster of pixels; and capturing, processing, generating, rendering, or displaying a second image based on the second region of interest, wherein the second image has a first resolution in a first region corresponding to the second region of interest and a second resolution in a second region outside the first region and wherein the first resolution is higher than the second resolution.

In another example, an apparatus for foveated imaging is provided that includes at least one memory and at least one processor (e.g., configured in circuitry) coupled to the at least one memory. The at least one processor configured to: determine a first region of interest within a first image based on a gaze of a user relative to the first image; cluster pixels of the first image into a one or more clusters of pixels based on a comparison of one or more characteristics of pixels of the first image; identify a cluster of pixels from among the one or more clusters of pixels based on an intersection over union of the first region of interest and the cluster of pixels; generate a second region of interest based on the first region of interest and the cluster of pixels; and capture, process, generate, render, or display a second image based on the second region of interest, wherein the second image has a first resolution in a first region corresponding to the second region of interest and a second resolution in a second region outside the first region and wherein the first resolution is higher than the second resolution.

In another example, a non-transitory computer-readable medium is provided that has stored thereon instructions that, when executed by one or more processors, cause the one or more processors to: determine a first region of interest within a first image based on a gaze of a user relative to the first image; cluster pixels of the first image into a one or more clusters of pixels based on a comparison of one or more characteristics of pixels of the first image; identify a cluster of pixels from among the one or more clusters of pixels based on an intersection over union of the first region of interest and the cluster of pixels; generate a second region of interest based on the first region of interest and the cluster of pixels; and capture, process, generate, render, or display a second image based on the second region of interest, wherein the second image has a first resolution in a first region corresponding to the second region of interest and a second resolution in a second region outside the first region and wherein the first resolution is higher than the second resolution.

In another example, an apparatus for foveated imaging is provided. The apparatus includes: means for determining a first region of interest within a first image based on a gaze of a user relative to the first image; means for clustering pixels of the first image into a one or more clusters of pixels based on a comparison of one or more characteristics of pixels of the first image; means for identifying a cluster of pixels from among the one or more clusters of pixels based on an intersection over union of the first region of interest and the cluster of pixels; means for generating a second region of interest based on the first region of interest and the cluster of pixels; and means for capturing, processing, generating, rendering, or displaying a second image based on the second region of interest, wherein the second image has a first resolution in a first region corresponding to the second region of interest and a second resolution in a second region outside the first region and wherein the first resolution is higher than the second resolution In some aspects, one or more of the apparatuses described herein is, can be part of, or can include an extended reality device (e.g., a virtual reality (VR) device, an augmented reality (AR) device, or a mixed reality (MR) device), a vehicle (or a computing device, system, or component of a vehicle), a mobile device (e.g., a mobile telephone or so-called "smart phone", a tablet computer, or other type of mobile device), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures:

FIG. 7 includes a representation of an example image grid including ROI cells and non-ROI cells, according to various aspects of the present disclosure;

FIG. 12 is a flow diagram illustrating an example process for foveated imaging, in accordance with aspects of the present disclosure;

DETAILED DESCRIPTION

Figure 1:
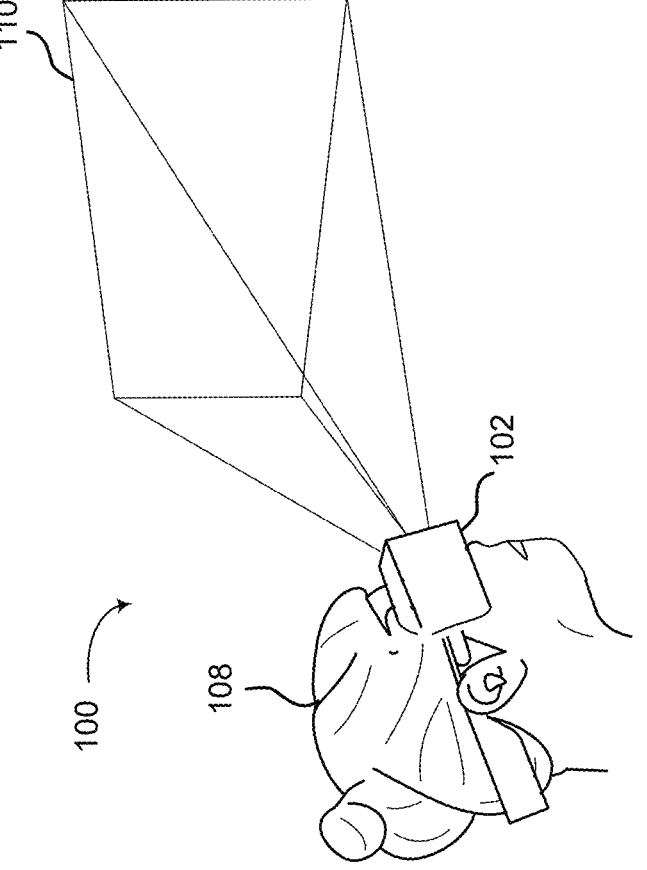
FIG. 1 is a diagram illustrating an example extended-reality (XR) system, according to aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

As noted previously, an extended reality (XR) system or device can provide a user with an XR experience by presenting virtual content to the user (e.g., for a completely immersive experience) and/or can combine a view of a real-world or physical environment with a display of a virtual environment (made up of virtual content). The real-world environment can include real-world objects (also referred to as physical objects), such as people, vehicles, buildings, tables, chairs, and/or other real-world or physical objects. As used herein, the terms XR system and XR device are used interchangeably. Examples of XR systems or devices include head-mounted displays (HMDs) (which may also be referred to as a head-mounted devices), XR glasses (e.g., AR glasses, MR glasses, etc.) (also referred to as smart or network-connected glasses), among others. In some cases, XR glasses are an example of an HMD. In some cases, an XR system can track parts of the user (e.g., a hand and/or fingertips of a user) to allow the user to interact with items of virtual content.

XR systems can include virtual reality (VR) systems facilitating interactions with VR environments, augmented reality (AR) systems facilitating interactions with AR environments, mixed reality (MR) systems facilitating interactions with MR environments, and/or other XR systems.

For instance, VR provides a complete immersive experience in a three-dimensional (3D) computer-generated VR environment or video depicting a virtual version of a real-world environment. VR content can include VR video in some cases, which can be captured and rendered at very high quality, potentially providing a truly immersive virtual reality experience. Virtual reality applications can include gaming, training, education, sports video, online shopping, among others. VR content can be rendered and displayed using a VR system or device, such as a VR HMD or other VR headset, which fully covers a user's eyes during a VR experience.

AR is a technology that provides virtual or computer-generated content (referred to as AR content) over the user's view of a physical, real-world scene or environment. AR content can include virtual content, such as video, images, graphic content, location data (e.g., global positioning system (GPS) data or other location data), sounds, any combination thereof, and/or other augmented content. An AR system or device is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

MR technologies can combine aspects of VR and AR to provide an immersive experience for a user. For example, in an MR environment, real-world and computer-generated objects can interact (e.g., a real person can interact with a virtual person as if the virtual person were a real person).

An XR environment can be interacted with in a seemingly real or physical way. As a user experiencing an XR environment (e.g., an immersive VR environment) moves in the real world, rendered virtual content (e.g., images rendered in a virtual environment in a VR experience) also changes, giving the user the perception that the user is moving within the XR environment. For example, a user can turn left or right, look up or down, and/or move forwards or backwards, thus changing the user's point of view of the XR environment. The XR content presented to the user can change accordingly, so that the user's experience in the XR environment is as seamless as it would be in the real world.

In some cases, an XR system can match the relative pose and movement of objects and devices in the physical world. For example, an XR system can use tracking information to calculate the relative pose of devices, objects, and/or features of the real-world environment in order to match the relative position and movement of the devices, objects, and/or the real-world environment. In some examples, the XR system can use the pose and movement of one or more devices, objects, and/or the real-world environment to render content relative to the real-world environment in a convincing manner. The relative pose information can be used to match virtual content with the user's perceived motion and the spatio-temporal state of the devices, objects, and real-world environment. In some cases, an XR system can track parts of the user (e.g., a hand and/or fingertips of a user) to allow the user to interact with items of virtual content.

XR systems or devices can facilitate interaction with different types of XR environments (e.g., a user can use an XR system or device to interact with an XR environment). One example of an XR environment is a metaverse virtual environment. A user may virtually interact with other users (e.g., in a social setting, in a virtual meeting, etc.), virtually shop for items (e.g., goods, services, property, etc.), to play computer games, and/or to experience other services in a metaverse virtual environment. In one illustrative example, an XR system may provide a 3D collaborative virtual environment for a group of users. The users may interact with one another via virtual representations of the users in the virtual environment. The users may visually, audibly, haptically, or otherwise experience the virtual environment while interacting with virtual representations of the other users.

A virtual representation of a user may be used to represent the user in a virtual environment. A virtual representation of a user is also referred to herein as an avatar. An avatar representing a user may mimic an appearance, movement, mannerisms, and/or other features of the user. In some examples, the user may desire that the avatar representing the person in the virtual environment appear as a digital twin of the user. In any virtual environment, it is important for an XR system to efficiently generate high-quality avatars (e.g., realistically representing the appearance, movement, etc. of the person) in a low-latency manner. It can also be important for the XR system to render audio in an effective manner to enhance the XR experience.

In some cases, an XR system can include an optical "see-through" or "pass-through" display (e.g., see-through or pass-through AR HMD or AR glasses), allowing the XR system to display XR content (e.g., AR content) directly onto a real-world view without displaying video content. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world.

As noted previously, a foveated image may have different resolutions in different regions within the image. For example, a foveated image may include a highest resolution in a region of interest (ROI) and one or more lower-resolution regions around the ROI (e.g., in one or more "peripheral regions").

A foveated-image sensor can be configured to capture an image of an ROI of a field of view in high resolution. The image may be referred to as a "fovea region" or an "ROI." The foveated-image sensor may also capture another image of the full field of view at a lower resolution. The portion of the lower-resolution image that is outside the ROI may be referred to as the peripheral region. The image of the ROI may be inset into the other image of the peripheral region. The combine image may be referred to as a foveated image.

Additionally or alternatively, a processor can render or process a foveated image with image data of an ROI at a higher resolution and image data of a peripheral region at a lower resolution. Additionally or alternatively, a processor, a display driver, and/or a display may display foveated image with image data of an ROI displayed at a higher resolution and image data of a peripheral region displayed at a lower resolution.

Extended reality (XR) may include virtual reality (VR), augmented reality (AR), and/or mixed reality (MR). XR applications may benefit from foveated image capturing, rendering, processing, and/or displaying. For example, some XR head-mounted displays (HMDs) may render, process, and/or display foveated image data, (e.g., virtual content to be displayed at the HMD) in a foveated manner. The image data may be rendered, processed, and/or displayed at different qualities and/or resolutions at different regions of the image data. For example, the image data may be rendered at a highest resolution and/or quality in an ROI and at a lower resolution and/or quality outside the ROI.

As another example, some XR HMDs may implement video see through (VST). In VST, an XR HMD may capture images of a field of view of a user and display the images to the user as if the user were viewing the field of view directly. While displaying the images of the field of view, the XR HMD may alter or augment the images providing the user with an altered or augmented view of the environment of the user (e.g., providing the user with an XR experience). VST may benefit from foveated image capture and/or foveated image processing.

Foveated image sensing, rendering, processing, and/or displaying may be useful in XR because foveated-image sensing, rendering, processing, and/or displaying may allow an XR HMD to conserve computational resources (e.g., power, processing time, communication bandwidth etc.). For example, a foveated image of a field of view (or a smaller area) may be smaller in data size than a full-resolution image of the same field of view (or the same smaller area) because the peripheral region of the foveated image may have lower resolution and may be stored using less data. Thus, capturing, storing, processing, rendering, and/or displaying a foveated image rather than a full-resolution image may conserve computational resources.

Some devices may capture, process, render, and/or display foveated images based on a gaze of a user. For example, some devices may determine a gaze of a view (e.g., where the viewer is gazing within an image frame) and determine an ROI for foveated imaging based on the gaze. The device may then capture, render, process, and/or display image data (e.g., foveated image data) to have the highest resolution in the ROI and lower resolution outside the ROI (e.g., at "peripheral regions").

As noted, foveation may be applied to image capture, process, render, and/or display. Typically an ROI for foveation may be determined using one of two techniques. According to a first technique, an ROI may be determined based on a gaze of a user. For example, an ROI may be centered about an estimated gaze location. According to a second technique, saliency may be used for determining an ROI. For example, an image of a scene may be analyzed for saliency and a salient region of the image (e.g., a region of pixels representing a salient object) may be selected as the ROI. Saliency techniques may be suboptimal, as user's gaze might be focused elsewhere (maybe on periphery or on an object with lower saliency).

Systems, apparatuses, methods (also referred to as processes), and computer-readable media (collectively referred to herein as "systems and techniques") are described herein for foveated imaging. For example, the systems and techniques described herein may take both gaze information and saliency information into account and determine ROIs based on gaze information and saliency information.

The systems and techniques may incorporate gaze information and scene details such as texture, depth, saliency, etc., to determine an ROI and/or adjust the ROI. Determining and adjusting an ROI based on gaze and scene details may enhance user experience and/or save computing resources (e.g., power, and bandwidth). The systems and techniques may determine and adapt ROIs to include/encompass the object on which gaze is centered. Thus, the ROI may be more than a window centered around gaze or a window around object with highest predicted saliency.

Various aspects of the application will be described with respect to the figures below.

FIG. 1 is a diagram illustrating an example extended-reality (XR) system 100, according to aspects of the disclosure. As shown, XR system 100 includes an XR device 102. XR device 102 may implement, as examples, image-capture, object-detection, gaze-tracking, view-tracking, localization, computational and/or display aspects of extended reality, including virtual reality (VR), augmented reality (AR), and/or mixed reality (MR). For example, XR device 102 may include one or more scene-facing cameras that may capture images of a scene in which user 108 uses XR device 102. XR device 102 may detect objects in the scene based on the images of the scene. Further, XR device 102 may include one or more user-facing cameras that may capture images of eyes of user 108. XR device 102 may determine a gaze of user 108 based on the images of user 108. XR device 102 may determine an object of interest in the scene based on the gaze of user 108. XR device 102 may obtain and/or render information (e.g., text, images, and/or video based on the object of interest). XR device 102 may display the information to a user 108 (e.g., within a field of view 110 of user 108).

XR device 102 may display the information to be viewed by a user 108 in field of view 110 of user 108. For example, in a "see-through" configuration, XR device 102 may include a transparent surface (e.g., optical glass) such that information may be displayed on (e.g., by being projected onto) the transparent surface to overlay the information onto the scene as viewed through the transparent surface. In a "pass-through" configuration or a "video see-through" configuration, XR device 102 may include a scene-facing camera that may capture images of the scene of user 108. XR device 102 may display images or video of the scene, as captured by the scene-facing camera, and information overlaid on the images or video of the scene.

In various examples, XR device 102 may be, or may include, a head-mounted device (HMD), a virtual reality headset, and/or smart glasses. XR device 102 may include one or more cameras, including scene-facing cameras and/or user-facing cameras, a GPU, one or more sensors (e.g., such as one or more inertial measurement units (IMUs), image sensors, and/or microphones), and/or one or more output devices (e.g., such as speakers, display, and/or smart glass).

In some aspects, XR device 102 may be, or may include, two or more devices. For example, XR device 102 may include a display device and a processing device. The display device may generate data, such as image data (e.g., from user-facing cameras and/or scene-facing cameras) and/or motion data (from an inertial measurement unit (IMU)). The display device may provide the data to the processing device, for example, through a wireless connection. The processing device may process the data and/or other data. Further, the processing unit may generate data to be displayed at the display device. The processing device may provide the generated data to the display device, for example, through the wireless connection.

Figure 2:
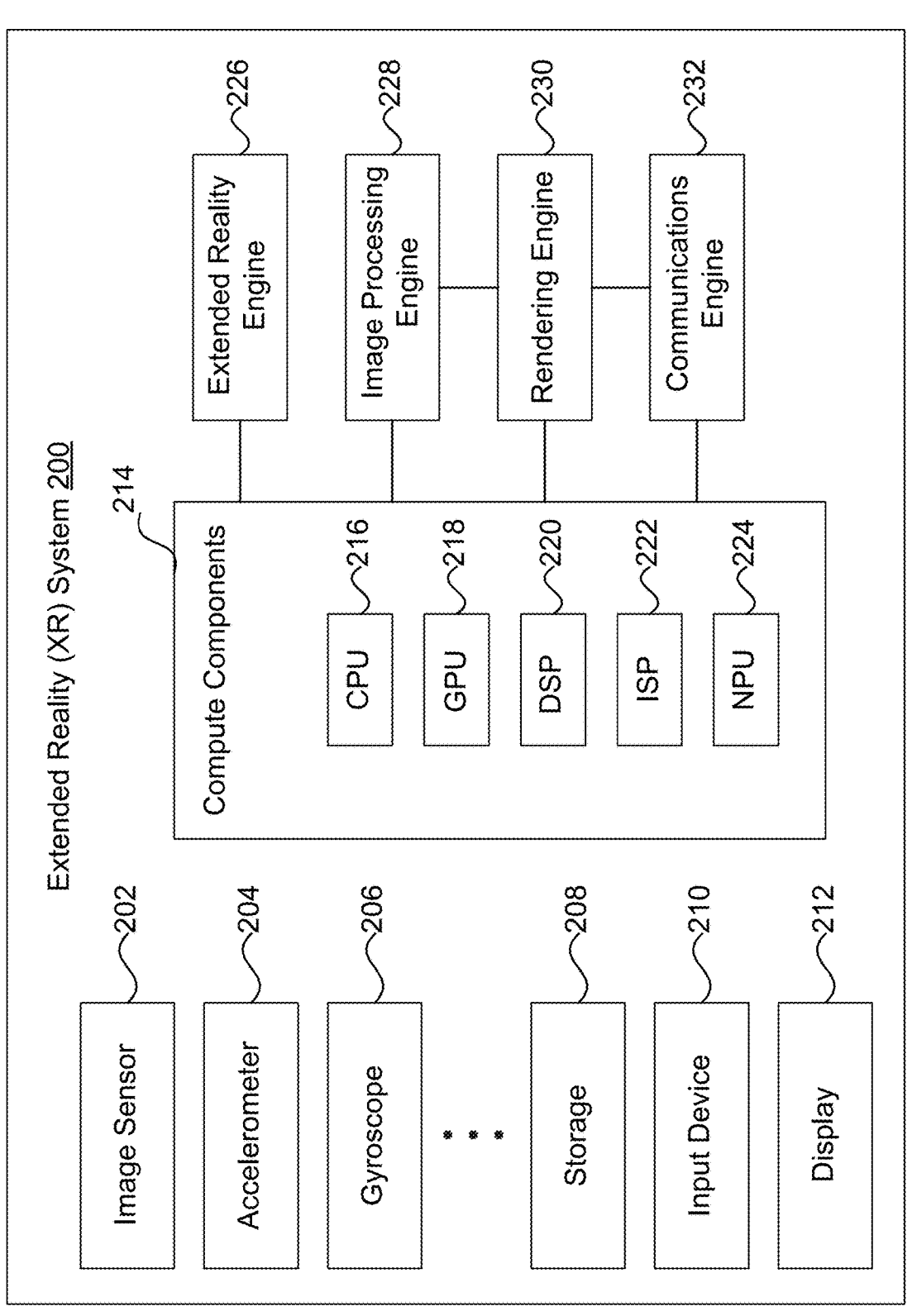
FIG. 2 is a block diagram illustrating an architecture of an example extended reality (XR) system, in accordance with some aspects of the disclosure.

FIG. 2 is a diagram illustrating an architecture of an example extended reality (XR) system 200, in accordance with some aspects of the disclosure. XR system 200 may execute XR applications and implement XR operations.

In this illustrative example, XR system 200 includes one or more image sensors 202, an accelerometer 204, a gyroscope 206, storage 208, an input device 210, a display 212, Compute components 214, an XR engine 226, an image processing engine 228, a rendering engine 230, and a communications engine 232. It should be noted that the components 202-232 shown in FIG. 2 are non-limiting examples provided for illustrative and explanation purposes, and other examples may include more, fewer, or different components than those shown in FIG. 2. For example, in some cases, XR system 200 may include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors, audio sensors, etc.), one or more display devices, one more other processing engines, one or more other hardware components, and/or one or more other software and/or hardware components that are not shown in FIG. 2. While various components of XR system 200, such as image sensor 202, may be referenced in the singular form herein, it should be understood that XR system 200 may include multiple of any component discussed herein (e.g., multiple image sensors 202).

Display 212 may be, or may include, a glass, a screen, a lens, a projector, and/or other display mechanism that allows a user to see the real-world environment and also allows XR content to be overlaid, overlapped, blended with, or otherwise displayed thereon.

XR system 200 may include, or may be in communication with, (wired or wirelessly) an input device 210. Input device 210 may include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device discussed herein, or any combination thereof. In some cases, image sensor 202 may capture images that may be processed for interpreting gesture commands.

XR system 200 may also communicate with one or more other electronic devices (wired or wirelessly). For example, communications engine 232 may be configured to manage connections and communicate with one or more electronic devices. In some cases, communications engine 232 may correspond to communication interface 1526 of FIG. 15.

In some implementations, image sensors 202, accelerometer 204, gyroscope 206, storage 208, display 212, compute components 214, XR engine 226, image processing engine 228, and rendering engine 230 may be part of the same computing device. For example, in some cases, image sensors 202, accelerometer 204, gyroscope 206, storage 208, display 212, compute components 214, XR engine 226, image processing engine 228, and rendering engine 230 may be integrated into an HMD, extended reality glasses, smartphone, laptop, tablet computer, gaming system, and/or any other computing device. However, in some implementations, image sensors 202, accelerometer 204, gyroscope 206, storage 208, display 212, compute components 214, XR engine 226, image processing engine 228, and rendering engine 230 may be part of two or more separate computing devices. For instance, in some cases, some of the components 202-232 may be part of, or implemented by, one computing device and the remaining components may be part of, or implemented by, one or more other computing devices. For example, such as in a split perception XR system, XR system 200 may include a first device (e.g., an HMD), including display 212, image sensor 202, accelerometer 204, gyroscope 206, and/or one or more compute components 214. XR system 200 may also include a second device including additional compute components 214 (e.g., implementing XR engine 226, image processing engine 228, rendering engine 230, and/or communications engine 232). In such an example, the second device may generate virtual content based on information or data (e.g., images, sensor data such as measurements from accelerometer 204 and gyroscope 206) and may provide the virtual content to the first device for display at the first device. The second device may be, or may include, a smartphone, laptop, tablet computer, personal computer, gaming system, a server computer or server device (e.g., an edge or cloud-based server, a personal computer acting as a server device, or a mobile device acting as a server device), any other computing device and/or a combination thereof.

Storage 208 may be any storage device(s) for storing data. Moreover, storage 208 may store data from any of the components of XR system 200. For example, storage 208 may store data from image sensor 202 (e.g., image or video data), data from accelerometer 204 (e.g., measurements), data from gyroscope 206 (e.g., measurements), data from compute components 214 (e.g., processing parameters, preferences, virtual content, rendering content, scene maps, tracking and localization data, object detection data, privacy data, XR application data, face recognition data, occlusion data, etc.), data from XR engine 226, data from image processing engine 228, and/or data from rendering engine 230 (e.g., output frames). In some examples, storage 208 may include a buffer for storing frames for processing by compute components 214.

Compute components 214 may be, or may include, a central processing unit (CPU) 216, a graphics processing unit (GPU) 218, a digital signal processor (DSP) 220, an image signal processor (ISP) 222, a neural processing unit (NPU) 224, which may implement one or more trained neural networks, and/or other processors. Compute components 214 may perform various operations such as image enhancement, computer vision, graphics rendering, extended reality operations (e.g., tracking, localization, pose estimation, mapping, content anchoring, content rendering, predicting, etc.), image and/or video processing, sensor processing, recognition (e.g., text recognition, facial recognition, object recognition, feature recognition, tracking or pattern recognition, scene recognition, occlusion detection, etc.), trained machine-learning operations, filtering, and/or any of the various operations described herein. In some examples, compute components 214 may implement (e.g., control, operate, etc.) XR engine 226, image processing engine 228, and rendering engine 230. In other examples, compute components 214 may also implement one or more other processing engines.

Image sensor 202 may include any image and/or video sensors or capturing devices. In some examples, image sensor 202 may be part of a multiple-camera assembly, such as a dual-camera assembly. Image sensor 202 may capture image and/or video content (e.g., raw image and/or video data), which may then be processed by compute components 214, XR engine 226, image processing engine 228, and/or rendering engine 230 as described herein.

In some examples, image sensor 202 may capture image data and may generate images (also referred to as frames) based on the image data and/or may provide the image data or frames to XR engine 226, image processing engine 228, and/or rendering engine 230 for processing. An image or frame may include a video frame of a video sequence or a still image. An image or frame may include a pixel array representing a scene. For example, an image may be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, image sensor 202 (and/or other camera of XR system 200) may be configured to also capture depth information. For example, in some implementations, image sensor 202 (and/or other camera) may include an RGB-depth (RGB-D) camera. In some cases, XR system 200 may include one or more depth sensors (not shown) that are separate from image sensor 202 (and/or other camera) and that may capture depth information. For instance, such a depth sensor may obtain depth information independently from image sensor 202. In some examples, a depth sensor may be physically installed in the same general location or position as image sensor 202 but may operate at a different frequency or frame rate from image sensor 202. In some examples, a depth sensor may take the form of a light source that may project a structured or textured light pattern, which may include one or more narrow bands of light, onto one or more objects in a scene. Depth information may then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

XR system 200 may also include other sensors in its one or more sensors. The one or more sensors may include one or more accelerometers (e.g., accelerometer 204), one or more gyroscopes (e.g., gyroscope 206), and/or other sensors. The one or more sensors may provide velocity, orientation, and/or other position-related information to compute components 214. For example, accelerometer 204 may detect acceleration by XR system 200 and may generate acceleration measurements based on the detected acceleration. In some cases, accelerometer 204 may provide one or more translational vectors (e.g., up/down, left/right, forward/back) that may be used for determining a position or pose of XR system 200. Gyroscope 206 may detect and measure the orientation and angular velocity of XR system 200. For example, gyroscope 206 may be used to measure the pitch, roll, and yaw of XR system 200. In some cases, gyroscope 206 may provide one or more rotational vectors (e.g., pitch, yaw, roll). In some examples, image sensor 202 and/or XR engine 226 may use measurements obtained by accelerometer 204 (e.g., one or more translational vectors) and/or gyroscope 206 (e.g., one or more rotational vectors) to calculate the pose of XR system 200. As previously noted, in other examples, XR system 200 may also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors may include at least one IMU. An IMU is an electronic device that measures the specific force, angular rate, and/or the orientation of XR system 200, using a combination of one or more accelerometers, one or more gyroscopes, and/or one or more magnetometers. In some examples, the one or more sensors may output measured information associated with the capture of an image captured by image sensor 202 (and/or other camera of XR system 200) and/or depth information obtained using one or more depth sensors of XR system 200.

The output of one or more sensors (e.g., accelerometer 204, gyroscope 206, one or more IMUs, and/or other sensors) can be used by XR engine 226 to determine a pose of XR system 200 (also referred to as the head pose) and/or the pose of image sensor 202 (or other camera of XR system 200). In some cases, the pose of XR system 200 and the pose of image sensor 202 (or other camera) can be the same. The pose of image sensor 202 refers to the position and orientation of image sensor 202 relative to a frame of reference (e.g., with respect to a field of view 110 of FIG. 1). In some implementations, the camera pose can be determined for 6-Degrees of Freedom (6DoF), which refers to three translational components (e.g., which can be given by X (horizontal), Y (vertical), and Z (depth) coordinates relative to a frame of reference, such as the image plane) and three angular components (e.g., roll, pitch, and yaw relative to the same frame of reference). In some implementations, the camera pose can be determined for 3-Degrees of Freedom (3DoF), which refers to the three angular components (e.g., roll, pitch, and yaw).

In some cases, a device tracker (not shown) can use the measurements from the one or more sensors and image data from image sensor 202 to track a pose (e.g., a 6DoF pose) of XR system 200. For example, the device tracker can fuse visual data (e.g., using a visual tracking solution) from the image data with inertial data from the measurements to determine a position and motion of XR system 200 relative to the physical world (e.g., the scene) and a map of the physical world. As described below, in some examples, when tracking the pose of XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of XR system 200 within the scene and the 3D map of the scene, etc. The 3D map can provide a digital representation of a scene in the real/physical world. In some examples, the 3D map can anchor position-based objects and/or content to real-world coordinates and/or objects. XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or XR system 200 as a whole can be determined and/or tracked by compute components 214 using a visual tracking solution based on images captured by image sensor 202 (and/or other camera of XR system 200). For instance, in some examples, compute components 214 can perform tracking using computer vision-based tracking, model-based tracking, and/or simultaneous localization and mapping (SLAM) techniques. For instance, compute components 214 can perform SLAM or can be in communication (wired or wireless) with a SLAM system (not shown). SLAM refers to a class of techniques where a map of an environment (e.g., a map of an environment being modeled by XR system 200) is created while simultaneously tracking the pose of a camera (e.g., image sensor 202) and/or XR system 200 relative to that map. The map can be referred to as a SLAM map and can be three-dimensional (3D). The SLAM techniques can be performed using color or grayscale image data captured by image sensor 202 (and/or other camera of XR system 200) and can be used to generate estimates of 6DoF pose measurements of image sensor 202 and/or XR system 200. Such a SLAM technique configured to perform 6DoF tracking can be referred to as 6DoF SLAM. In some cases, the output of the one or more sensors (e.g., accelerometer 204, gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 214 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be deep-learning (DL) features. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

As one illustrative example, the compute components 214 can extract feature points corresponding to a mobile device, or the like. In some cases, feature points corresponding to the mobile device can be tracked to determine a pose of the mobile device. As described in more detail below, the pose of the mobile device can be used to determine a location for projection of AR media content that can enhance media content displayed on a display of the mobile device.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3A:
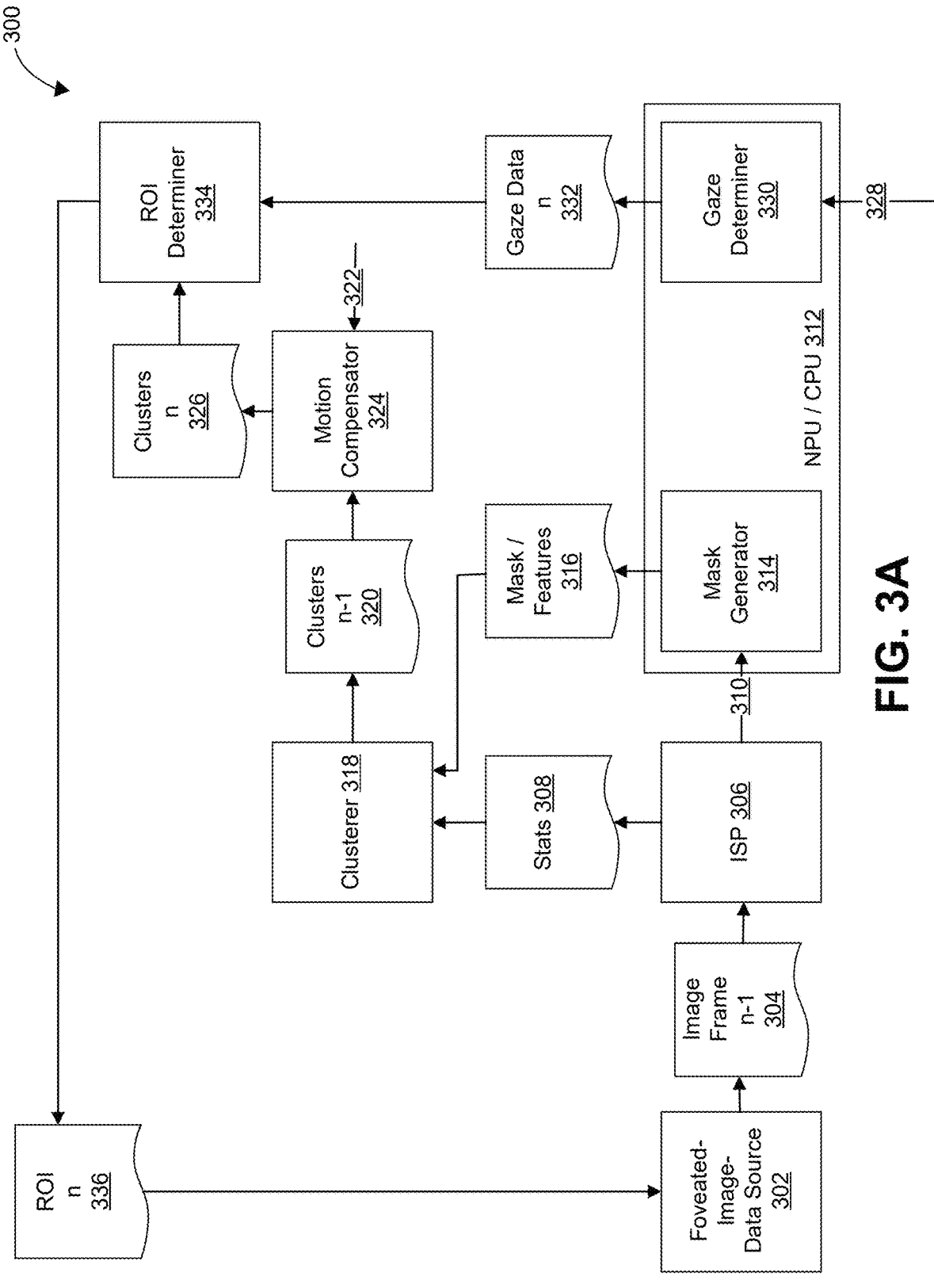
FIG. 3A is a block diagram illustrating an example system 300 for determining an ROI, for example, for foveated imaging, according to various aspects of the present disclosure.

FIG. 3A is a block diagram illustrating an example system 300 for determining an ROI, for example, for foveated imaging, according to various aspects of the present disclosure. In general, a foveated-image-data source 302 (e.g., a foveated-image sensor or foveated-image renderer) may provide an image frame 304 to an image signal processor (ISP) 306. ISP 306 may process image frame 304 to generate statistics 308 and processed image data 310. A mask generator 314 of a processing unit 312 (e.g., a neural processing unit (NPU) or a central processing unit (CPU)) may process processed image data 310 to generate mask and/or feature data 316. A clusterer 318 may generate clusters 320 based on statistics 308 and/or mask and/or feature data 316. A motion compensator 324 may generate clusters 326 based on clusters 320 and motion data 322 (e.g., using motion data 322 to compensate for motion of a camera that captured image frame 304). Additionally, a gaze determiner 330 may generate gaze data 332 based on eye images 328. An ROI determiner 334 may generate ROI 336 based on clusters 326 and gaze data 332. ROI determiner 334 may provide ROI 336 to foveated-image-data source 302. Foveated-image-data source 302 may use ROI 336 to capture or render further image data (e.g., further instances of image frame 304). For example, foveated-image-data source 302 may capture a first image frame 304 "n−1." ROI determiner 334 may determine a first ROI 336 "n" for a subsequent imager frame "n." Foveated-image-data source 302 may then capture an image frame 304 "n."

Foveated-image-data source 302 may be a source of foveated image data. In some aspects, foveated-image-data source 302 may be, or may include, a foveated-image sensor (e.g., an image sensor capable of capturing image frames including regions having different resolutions). In some aspects, foveated-image-data source 302 may be, or may include, a foveated image renderer (e.g., an image renderer capable of rendering image frames including regions having different resolutions). Foveated-image-data source 302 may generate or render foveated image frames.

A foveated image frame may include an ROI (which may alternatively be referred to as a fovea region) at a first resolution and one or more peripheral regions at one or more other resolutions. The first resolution may be higher than the one or more other resolutions.

Figure 4:
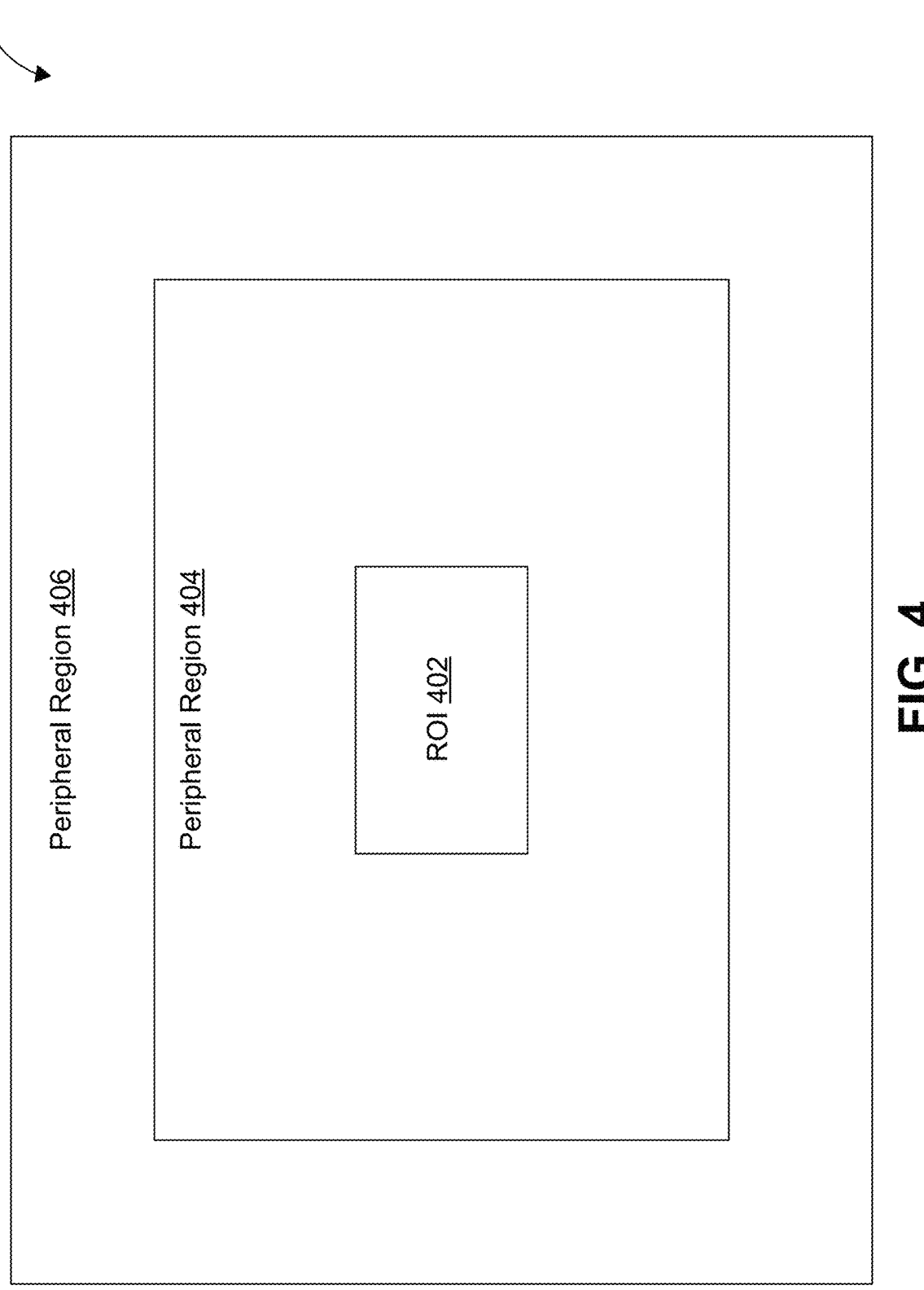
FIG. 4 includes a representation of an example foveated image, according to various aspects of the present disclosure.

For example, FIG. 4 includes a representation of an example foveated image, according to various aspects of the present disclosure. For example, image 400 is an example of an image frame including a ROI 402, a peripheral region 404 and a peripheral region 406. ROI 402 may have a first resolution. Peripheral region 404 may be around ROI 402 and may have a second resolution that is lower than the first resolution. Peripheral region 406 may be around peripheral region 404 and may have a third resolution lower than the second resolution. A foveated image, according to various aspects of the present disclosure, may have any number of ROIs and/or any number of peripheral regions. The ROIs may, or may not, be rectangular.

Returning to FIG. 3A, image frame 304 may, or may not, be a foveated image frame. For example, in some instances, image frame 304 may be captured prior to a determination of an ROI. In other instances, foveated-image-data source 302 may receive an indication of an ROI and may capture or render image frame 304 as a foveated image frame based on the ROI.

ISP 306 may process image frame 304 to generate statistics 308. For example, in some aspects, ISP 306 may segment image frame 304 according to a grid to generate a number of cells. ISP 306 may determine statistics 308 for each of the cells. For instances, ISP 306 may determine statistics 308 to include, as examples, a sharpness of each of the cells (e.g., a sharpness of edges represented by pixels of the cells), a brightness of pixels of the cells, one or more colors of pixels of the cells, a pattern of the cells (e.g., a pattern represented by the pixels of a cell), and/or a depth label associated with the cells. Additionally or alternatively, statistics 308 may be, or may include, statistics for individual pixels. For example, statistics 308 may include a brightness of pixels, a color of pixels, and/or a depth label associated with pixels.

Additionally, ISP 306 may process image frame 304 to generate processed image data 310. For example, ISP 306 may denoise image frame 304 to generate processed image data 310.

Mask generator 314 may generate mask and/or feature data 316 based on processed image data 310. In some aspects, mask generator 314 may be, or may include, an image segmenter (e.g., a machine-learning model trained to identify segments of an image). Mask generator 314 may generate a mask (e.g., of mask and/or feature data 316) that may include associations between pixels of image frame 304 and labels (e.g., segment labels). In some aspects, mask generator 314 may be, or may include, a saliency-based image segmenter that may categorize pixels of image frame 304 according to a saliency of objects represented by the pixels.

Mask generator 314 may generate mask and/or feature data 316 to include a segmentation mask and/or a saliency mask indicative of labels and/or saliency of pixels of image frame 304. Additionally, in some aspects, mask generator 314 may encode processed image data 310 to generate image features. For example, mask generator 314 may include an image-encoder machine-learning model trained to generate image features based on image data. Mask generator 314 may include the image features in mask and/or feature data 316.

Clusterer 318 may generate clusters 320 based on statistics 308 and/or mask and/or feature data 316. In some cases, clusterer 318 may generate clusters 320 based on statistics 308. For example, clusterer 318 may cluster pixels (or cells of pixels) according to, for example, a sharpness of each of the cells, a brightness of pixels of the cells, one or more colors of pixels of the cells, a pattern of the cells, and/or a depth label associated with the cells. For example, clusterer 318 may group pixels (or cells of pixels) into clusters based on the pixels (or cells) of a given cluster having a similar sharpness, brightness, color, pattern, and/or depth label.

Clusterer 318 may cluster pixels (or cells of pixels) according to a selective-search algorithm, such as a selective search algorithm used in a region-based convolutional neural network (RCNN) proposal for proposing regions.

In some aspects, clusterer 318 may generate clusters 320 based on mask and/or feature data 316. For example, clusterer 318 may cluster pixels (or cells of pixels) according to, for example, a saliency label associated with the cells and/or an object label associated with the cells. For example, clusterer 318 may group pixels (or cells of pixels) into clusters based on the pixels (or cells) of a given cluster being associated with a common saliency label and/or object label.

Motion compensator 324 may compensate for motion of a camera that captured image frame 304. For example, motion compensator 324 may receive motion data 322 which may include, for example, inertial data from an inertial measurement unit (IMU) and/or pose predictions determined according to a SLAM technique. Motion compensator 324 may compensate for motion and/or predict a location of clusters in an upcoming image frame based on motion of the camera.

For example, image frame 304 may be an image frame captured at a first time (e.g., "n–1"). ISP 306 may generate statistics 308 based on image frame 304 and clusterer 318 may generate clusters 320 based on statistics 308. Thus, statistics 308 and clusters 320 may be related to the first time ("n–1"). Motion data 322 may be captured at substantially the first time (e.g., the same time that image frame 304 is captured). Motion compensator 324 may predict positions of clusters 320 based on motion data 322. In other words, motion compensator 324 may predict positions of clusters of pixels (or cells) of image frame 304 based on motion data 322. As such, when motion compensator 324 generates clusters 326, clusters 326 are for a time "n" which is after the time at which image frame 304 was captured.

Additionally, gaze determiner 330 may determine gaze data 332 based on eye images 328. For example, a camera may capture eye images 328 which may include images of eyes of a user. Gaze determiner 330 may determine where relative to an image frame the user is looking. In some aspects, gaze determiner 330 may determine an ROI based on eye images 328 and gaze data 332 may include a proposed ROI (e.g., proposed by gaze determiner 330). In other cases, gaze data 332 may be, or may include, a gaze center (e.g., a determined position where the user is gazing within an image frame). In some aspects, gaze determiner 330 may predict gaze data 332 for time "n," for example, based on an eye images 328 captured at time "n–1."

ROI determiner 334 may determine ROI 336 based on clusters 326 and gaze determiner 330. For example, ROI determiner 334 may determine a cluster at which the user is looking and generate ROI 336 to encompass the cluster at which the user is looking. Additionally or alternatively, ROI determiner 334 may exclude pixels or cells that are not included in the cluster at which the user is looking. Examples regarding operation of ROI determiner 334 are provided with regard to FIG. 5, FIG. 6, FIG. 7, FIG. 8, FIG. 10, and FIG. 11.

ROI determiner 334 may provide ROI 336 to foveated-image-data source 302 and foveated-image-data source 302 may generate (e.g., capture or render) further image data (e.g., further instances of image frame 304) based on ROI 336. For example, foveated-image-data source 302 may capture or render pixels corresponding to ROI 336 at a higher resolution and pixels outside ROI 336 at a lower resolution.

Figure 3B:
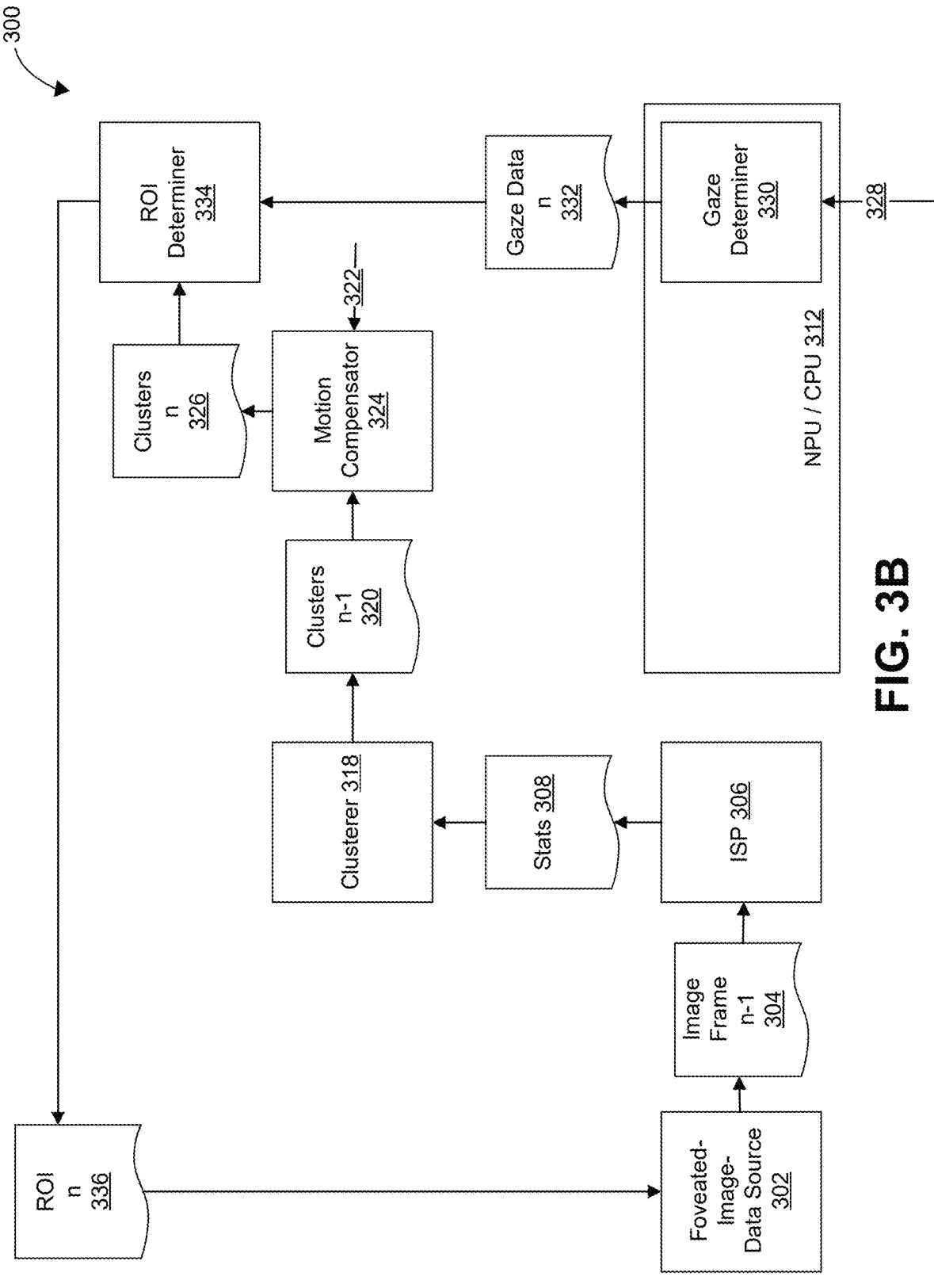
FIG. 3B is a block diagram illustrating another view of the example system of FIG. 3A for determining an ROI, for example, for foveated imaging, according to various aspects of the present disclosure.

In some aspects, system 300 may not use mask and/or feature data 316 of mask generator 314 (e.g., to conserve computational resources). In such cases, (e.g, when system 300 is operated in a power-saving mode), clusterer 318 may determine clusters 320 based on statistics 308 (e.g., without using mask and/or feature data 316). For example, FIG. 3B is a block diagram illustrating a system 300 without mask generator 314 to illustrate system 300 in an operational mode in which mask and/or feature data 316 of mask generator 314 is not used by clusterer 318 to determine clusters 320. In some aspects, mask generator 314 may be bypassed or disabled. In other aspects, mask generator 314 may still generate mask and/or feature data 316 but clusterer 318 may not use mask and/or feature data 316. System 300 may determine when to enable, include, disable, or bypass mask generator 314 based on a number of factors, such as a lighting condition of a scene captured by image frame 304 (e.g., manifest by a brightness of image frame 304), a power level of a device including system 300 and/or an operational mode of the device including system 300.

Figure 5:
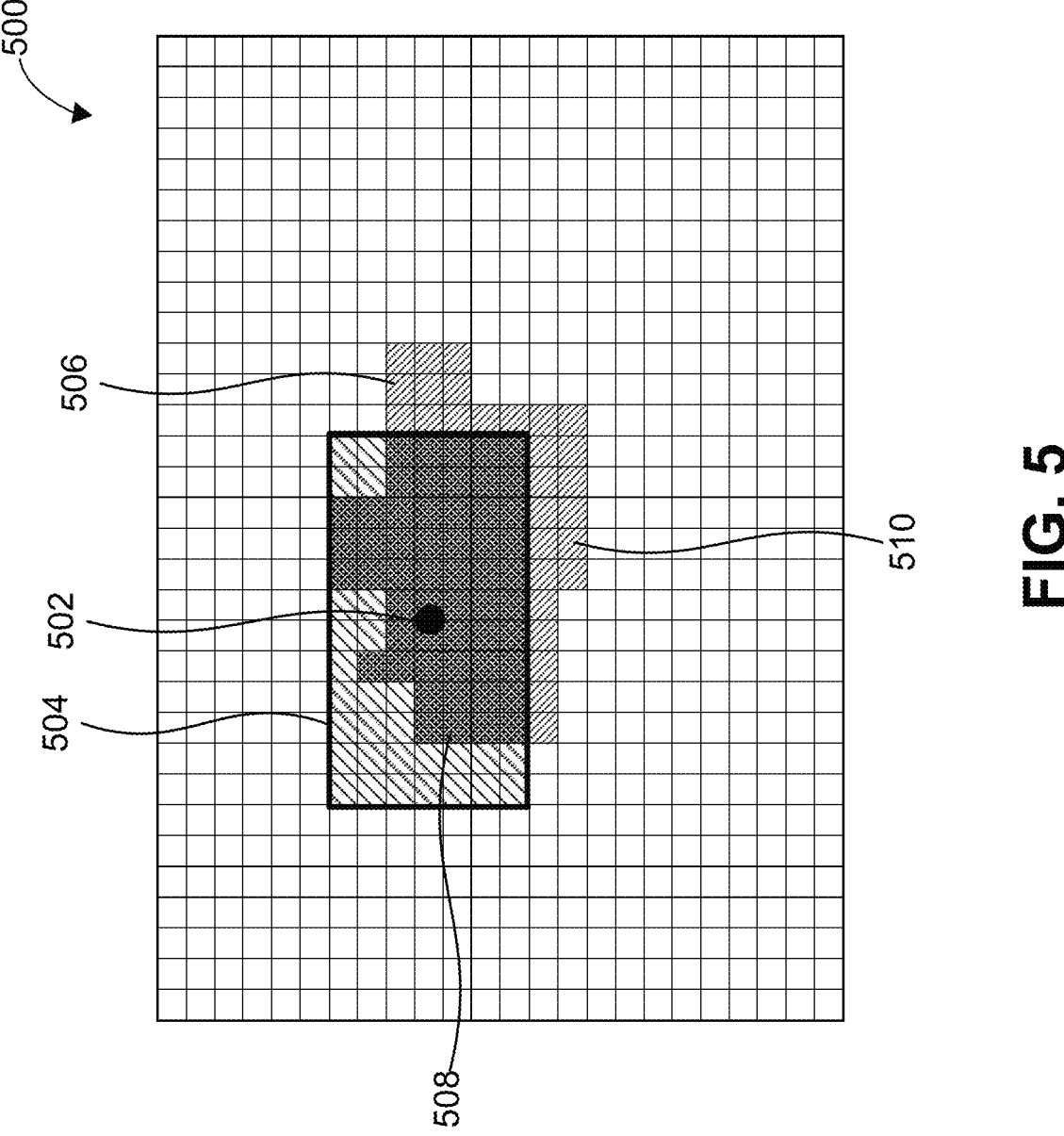
FIG. 5 includes a representation of an example image grid including ROI cells and non-ROI cells, according to various aspects of the present disclosure.

FIG. 5 includes a representation of an example image grid 500 including ROI cells and non-ROI cells, according to various aspects of the present disclosure. FIG. 5 provides context for an example of determining an ROI based on gaze data and a cluster.

Image grid 500 represents an image divided according to a grid into a number of cells. Each of the cells may be made up of a number of pixels. Image grid 500 is provided as an example to illustrated operations of system 300 of FIG. 3A and/or FIG. 3B.

Gaze center 502 represents a center of a gaze of a user (e.g., as determined by gaze determiner 330). For example, the center of the user's gaze may be at gaze center 502 in image grid 500. ROI 504 is an example ROI that may be determined as a window around gaze center 502. ROI 504 may have a predetermined size.

Gaze determiner 330 may determine gaze center 502 and/or ROI 504 based on eye images 328. Gaze determiner 330 may determine gaze data 332 to include an indication of gaze center 502 and/or ROI 504. In some aspects, ROI 504 may represent an ROI proposed based on gaze center 502. For example, gaze determiner 330 or ROI determiner 334 may determine ROI 504 as a gaze-based ROI.

Cluster 506 represents a cluster of cells. Cluster 506 includes out-of-ROI cluster blocks 510 and in-ROI cluster blocks 508. Clusterer 318 may determine cluster 506. Clusterer 318 may determine may cluster 506 based on the cells of cluster 506 having similar (or the same) sharpness, brightness, colors, patterns, depth, saliency labels and/or object labels. In some cases, cells of cluster 506 may represent one object. For example, an object in a scene may result in blocks of image pixels that exhibit a similar sharpness, brightness, color, pattern, depth, saliency label and/or object label.

It may be desirable to capture and/or render an image in which an object has the same resolution across the whole object. For example, may be more visually appealing to capture or render an entirety of an object at the same resolution rather than capturing or rendering the object with two or more different resolutions.

Capturing or rendering a foveated image based on ROI 504 (e.g., an image having pixels at ROI 504 have a first resolution and pixels not in ROI 504 at a lower resolution)

may result in an image including an object (e.g., represented by cluster 506) that includes pixels having different resolutions. For example, if ROI 504 is captured or rendered at a first resolution, in-ROI cluster blocks 508 of cluster 506 may be captured or rendered at the first resolution and out-of-ROI cluster blocks 510 may be captured or rendered at another resolution.

Figure 6:
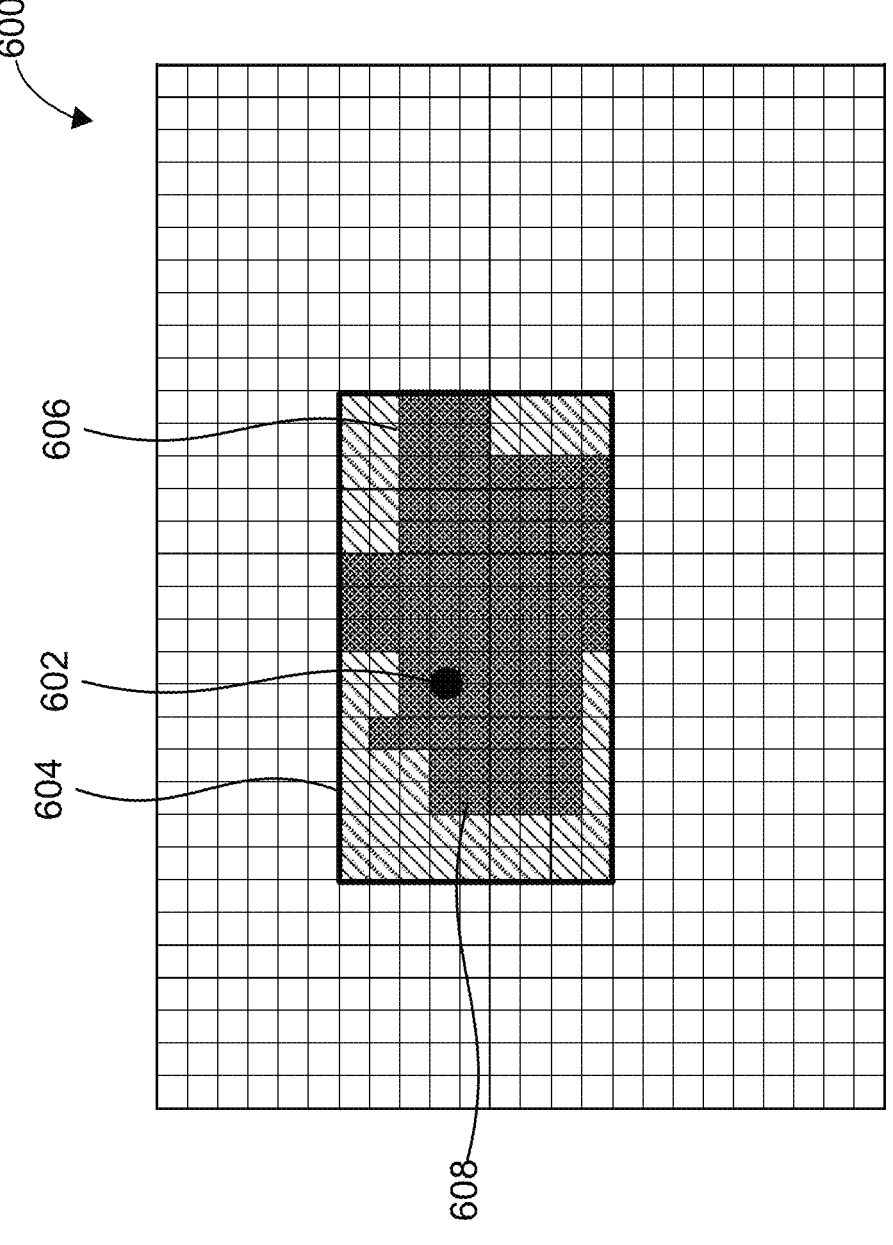
FIG. 6 includes a representation of an example image grid including ROI cells and non-ROI cells, according to various aspects of the present disclosure.

FIG. 6 includes a representation of an example image grid 600 including ROI cells and non-ROI cells, according to various aspects of the present disclosure. Image grid 600 is provided as an example to illustrated operations of system 300 of FIG. 3A and/or FIG. 3B. For example, image grid 600 may include the same pixels data as image grid 500 of FIG. 5. Yet, system 300 may determine ROI 604 differently than ROI 504 was determined. For example, gaze determiner 330 (or ROI determiner 334) may determine ROI 504 based on gaze data 332. ROI determiner 334 may determine ROI 604 based on gaze data 332 and clusters 326 (e.g., including cluster 606).

For example, in FIG. 6, ROI 604 is expanded to encompass all of cluster 606. ROI 604 may be generated by ROI determiner 334 based on gaze data (e.g., gaze data 332 which may be, or may include, an indication of gaze center 602) and cluster data (e.g., clusters 326 which may be, or may include, an indication of cluster 606).

For instance, ROI determiner 334 may select cluster 606 from a number of clusters of image grid 600 based on gaze center 602 being within cluster 606. ROI determiner 334 may expand ROI 604 to encompass all of cluster 606. By determining that ROI 336 includes all of cluster 606, (e.g., by expanding ROI 604 to encompass cluster 606), ROI determiner 334 may improve the selection of ROI 336 such that an object represented by cluster 606 is not represented at different resolutions.

FIG. 7 includes a representation of an example image grid 700 including ROI cells and non-ROI cells, according to various aspects of the present disclosure. Image grid 700 is provided as an example to illustrated operations of system 300 of FIG. 3A and/or FIG. 3B. For example, image grid 700 may include the same pixels data as image grid 500 of FIG. 5. Yet, system 300 may determine ROI 704 differently than ROI 504 was determined. For example, gaze determiner 330 (or ROI determiner 334) may determine ROI 504 based on gaze data 332. ROI determiner 334 may determine ROI 704 based on gaze data 332 and clusters 326 (e.g., including cluster 606).

In some cases, after generating ROI 604 to include all the cells of cluster 606, ROI determiner 334 may reduce the size of ROI 604 to exclude rows or columns of cells that are not included in cluster 606 (e.g., non-cluster non-ROI blocks 712) to generate ROI 704.

In other cases, ROI determiner 334 may generate ROI 704 based on ROI 504 and cluster 506 without first generating ROI 604. For example, ROI determiner 334 may determine ROI 704 to include cells of cluster 706 and to not include rows or columns that do not include cells of cluster 706.

In any case, ROI determiner 334 may determine cluster 706 based on gaze data 332 (e.g., based on gaze center 702) and based on clusters 326 (e.g., based on cluster 706).

Figure 8:
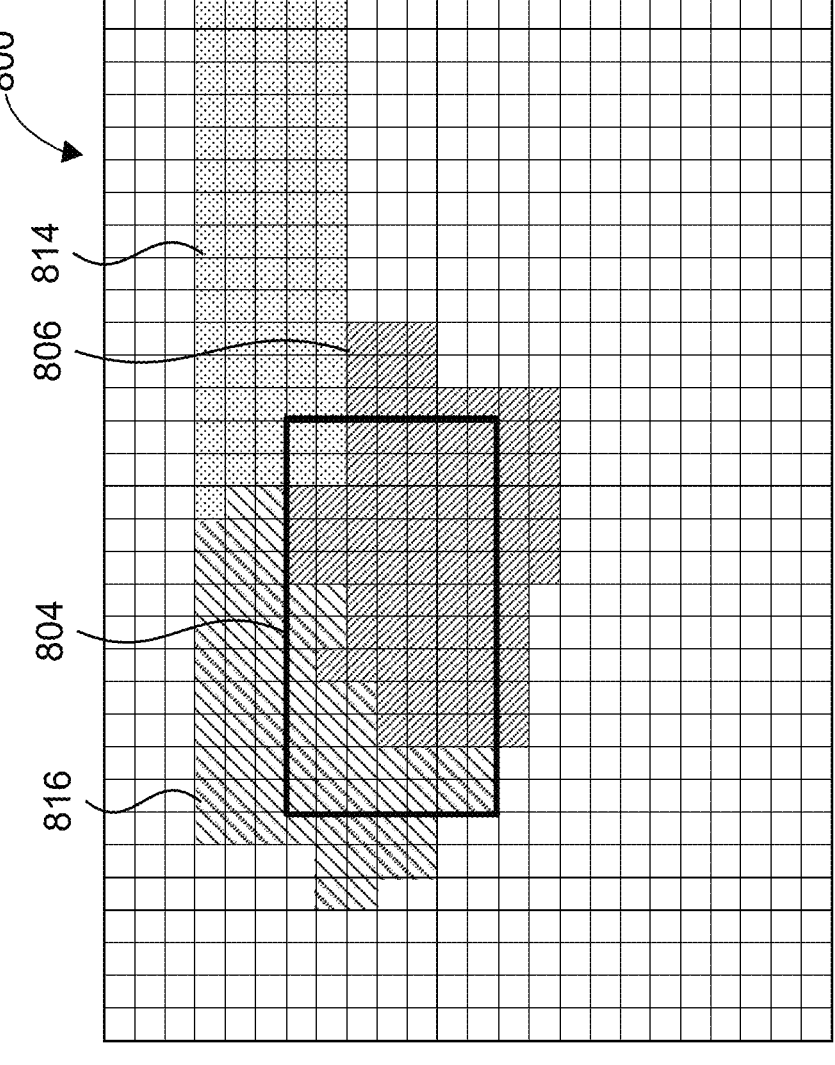
FIG. 8 includes a representation of an example image grid including ROI cells and non-ROI cells, according to various aspects of the present disclosure.

FIG. 8 includes a representation of an example image grid 800 including ROI cells and non-ROI cells, according to various aspects of the present disclosure. Image grid 800 is provided as an example to illustrate operations of system 300 of FIG. 3A and/or FIG. 3B. In the example provided with regard to FIG. 6, cluster 606 was selected as the cluster to which ROI 604 was tailored based on gaze center 602 being in cluster 606. Similarly, in the example provided with regard to FIG. 7, cluster 706 was selected as the cluster to which ROI 704 was tailored based on gaze center 702 being in cluster 706. FIG. 8 provides context for an example of selecting cluster 806 based on a metric that relates an ROI with a cluster rather than selecting a cluster directly based on a gaze center.

For example, image grid 800 includes a ROI 804. ROI 804 may be based on a gaze of a user. For example, gaze determiner 330 may determine ROI 804 based on eye images 328 of eyes of the user.

Image grid 800 additionally includes three example clusters (cluster 806, cluster 814, and cluster 816). Clusterer 318 may determine cluster 806, cluster 814, and cluster 816. Clusterer 318 may determine cluster 806 based on pixels of blocks of cluster 806 having similar (or the same) sharpness, brightness, colors, patterns, depth, saliency labels and/or object labels. Similarly, clusterer 318 may determine cluster 814 based on pixels of blocks of cluster 814 having similar (or the same) sharpness, brightness, colors, patterns, depth, saliency labels and/or object labels. Similarly, clusterer 318 may determine cluster 816 based on pixels of blocks of cluster 816 having similar (or the same) sharpness, brightness, colors, patterns, depth, saliency labels and/or object labels.

Clusters 326 may include an indication of cluster 806, cluster 814, and cluster 816. For example, clusterer 318 may determine a number of clusters of image grid 800 (including cluster 806, cluster 814, and cluster 816).

ROI determiner 334 may determine to which of cluster 806, cluster 814, and cluster 816 an ROI will be tailored based on a relationship between ROI 804 and the clusters (e.g., cluster 806, cluster 814, and cluster 816). For example, ROI determiner 334 may determine an intersection-over-union (IOU) of one or more clusters of image grid 800 and determine to tailor an ROI to one of the clusters based on the IOU of the cluster. For example, image grid 800 may determine an IOU of cluster 806, an IOU of cluster 814, and an IOU of cluster 816.

Figure 9:
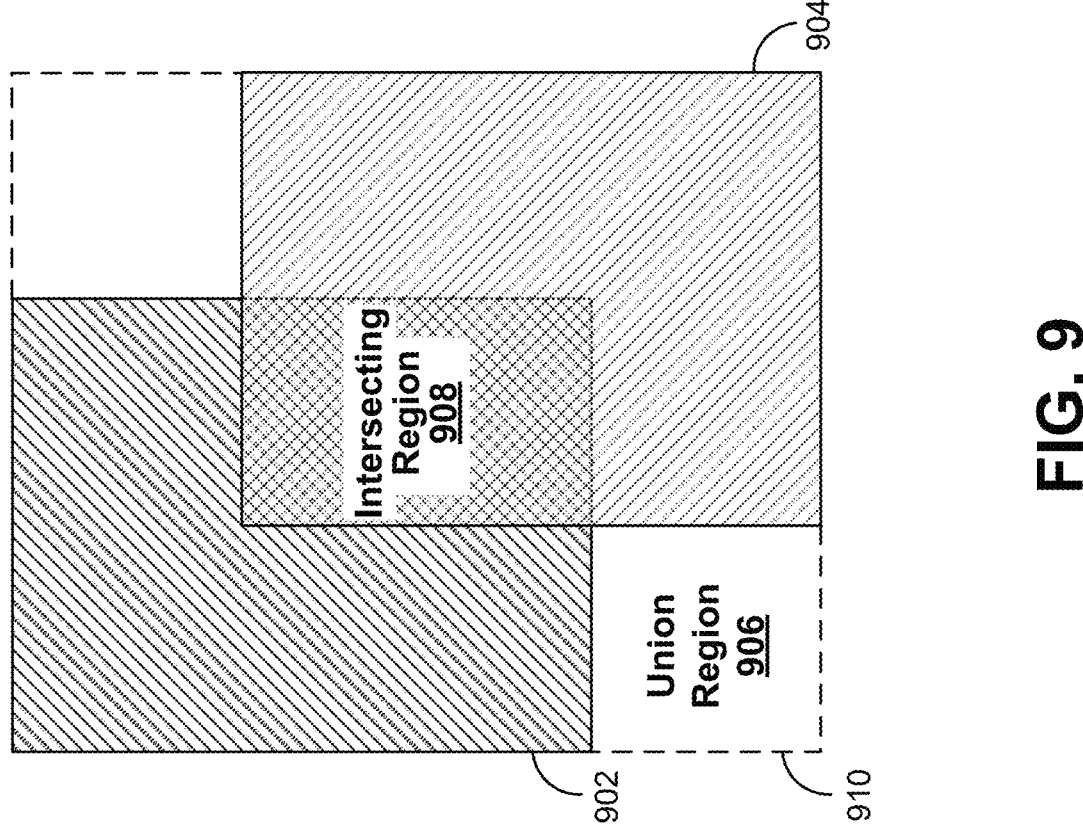
FIG. 9 is a diagram showing an example of an intersection and a union of two regions.

FIG. 9 is a diagram showing an example of an intersection I and union U of two regions, including a region 902 and a region 904. An intersecting region 908 includes the overlapped region between the region 902 and the region 904.

A union region 906 includes the union of region 902 and region 904. The union of region 902 and region 904 is defined to use the far corners of the two bounding boxes to create union 910 (shown as dotted line). More specifically, by representing each bounding box with (x, y, w, h), where (x, y) is the upper-left coordinate of a bounding box, w and h are the width and height of the bounding box, respectively, the union of the bounding boxes would be represented as follows:

$$\text{Union(region 902,region 904)}=(\min(x_1,x_2),\min(y_1, y_2),(\max(x_1+w_1-1,x_2+w_2-1)-\min(x_1,x_2)),(\max (y_1+h_1-1,y_2+h_2-1)-\min(y_1,y_2)))$$

An intersection over union (IOU) of region 902 and region 904 can be determined as an overlapping area between region 902 and region 904 (intersecting region 908) divided by union 910 of region 902 and region 904. For example, the IOU of region 902 and region 904 may be:

$$IOU(\text{region 902, region 904}) = \frac{\text{Area of Intersecting Region 908}}{\text{Area of Union 910}}.$$

Figure 10:
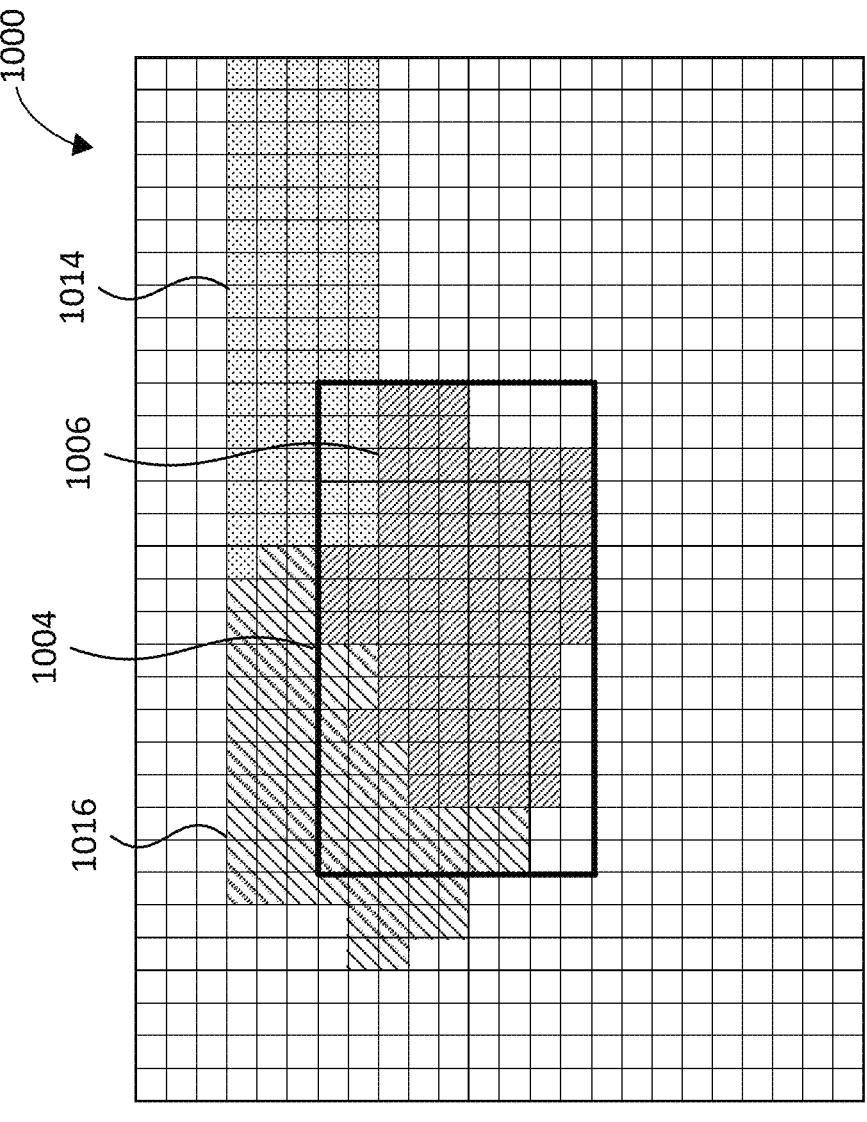
FIG. 10 includes a representation of an example image grid including ROI cells and non-ROI cells, according to various aspects of the present disclosure.
Figure 11:
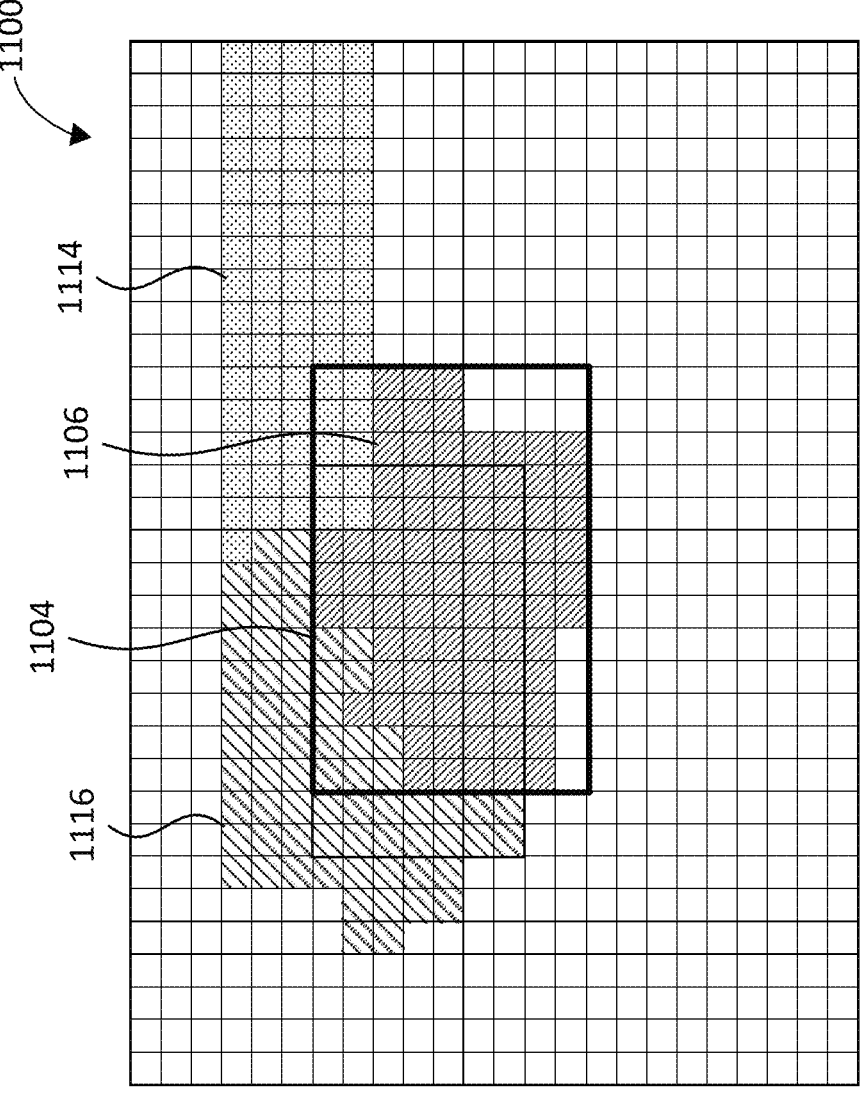
FIG. 11 includes a representation of an example image grid including ROI cells and non-ROI cells, according to various aspects of the present disclosure.

In some aspects, ROI determiner 334 may determine to tailor an ROI to a cluster with a highest IOU from among the clusters that have an intersection with ROI 804. For example, ROI determiner 334 may determine to tailor an ROI to cluster 806 (e.g., as described with regard to FIG. 6 and/or FIG. 7) based on cluster 806 having a higher IOU than the IOU of cluster 814 and higher than the IOU of cluster 816. For example, FIG. 10 is an illustration of image grid 1000 with ROI 1004 tailored to cluster 1006 and not to cluster 1014 or cluster 1016. As another example, FIG. 11 is an illustration of image grid 1100 with ROI 1104 tailored to cluster 1106 and not to cluster 1114 or cluster 1116.

Additionally or alternatively, ROI determiner 334 may determine to tailor an ROI to one or more clusters based on a respective IOU of the one or more clusters exceeding an IOU threshold. For example, if the IOU of a cluster exceeds the IOU threshold, ROI determiner 334 may determine to tailor an ROI to the cluster (e.g., as described with regard to FIG. 6 and/or FIG. 7). However, none the IOUs of the clusters exceed the IOU threshold, ROI determiner 334 may determine not to tailor the ROI. For example, ROI determiner 334 may determine to output ROI 804 (e.g., as ROI 336).

FIG. 12 is a flow diagram illustrating an example process 1200 for foveated imaging, in accordance with aspects of the present disclosure. One or more operations of process 1200 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the one or more operations of process 1200. The one or more operations of process 1200 may be implemented as software components that are executed and run on one or more processors.

At block 1202, a computing device (or one or more components thereof) may determine a first region of interest within a first image based on a gaze of a user relative to the first image. For example, gaze determiner 330 may determine gaze data 332 based on eye images 328.

At block 1204, the computing device (or one or more components thereof) may cluster pixels of the first image into a one or more clusters of pixels based on a comparison of one or more characteristics of pixels of the first image. For example, clusterer 318 may determine clusters 320 based on statistics 308. Statistics 308 may be based on a comparison of characteristics of image frame 304.

In some aspects, the one or more characteristics compared to cluster the pixels of the first image into the one or more clusters comprise at least one of: a brightness of the pixels; a color of the pixels; a saliency label associated with the pixels; an object label associated with the pixels; or a depth label associated with the pixels. For example, clusterer 318 may determine clusters 320 based on statistics 308, which may include brightness, color, saliency labels, object labels, and/or depth labels.

In some aspects, each cluster of pixels of one or more clusters of pixels comprises a cluster of blocks of pixels, wherein each cluster of pixels of the one or more clusters of pixels is determined based on a comparison the one or more characteristics of the blocks of pixels. For example, each square of FIG. 5, FIG. 6, FIG. 7, FIG. 8, FIG. 10, and FIG. 11 may represent a block of pixels.

In some aspects, the one or more characteristics compared to cluster the pixels of the first image into the one or more clusters comprise at least one of: a sharpness of pixels of the blocks of pixels; a brightness of the pixels of the blocks of pixels; one or more colors of the pixels of the blocks of pixels; a pattern of the blocks of pixels; a saliency label associated with the blocks of pixels; an object label associated with the blocks of pixels; or a depth label associated with the blocks of pixels. For example, clusterer 318 may determine clusters 320 based on statistics 308, which may include statistics of block of pixels. The statistics may include sharpness, brightness, colors, patterns, saliency labels, object labels, and/or depth labels.

In some aspects, the cluster of pixels is determined according to at least one of: a saliency-detection technique, an object-detection technique, or an image-segmentation technique. For example, mask generator 314 may determine feature data 316 based on saliency, detected objects, and/or segments. Clusterer 318 may determine clusters 320 based on feature data 316.

At block 1206, the computing device (or one or more components thereof) may identify a cluster of pixels from among the one or more clusters of pixels based on an intersection over union of the first region of interest and the cluster of pixels. For example, ROI determiner 334 may determine a cluster of clusters 326 based on an IOU of clusters 326 and gaze data 332 gaze data 332, for instance as described with regard to FIG. 8 and FIG. 9.

In some aspects, the intersection over union comprises an intersection of the first region of interest and the cluster of pixels divided by a union of the first region of interest and the cluster of pixels. For example, ROI determiner 334 may determine a cluster of clusters 326 based on an IOU of clusters 326 and gaze data 332 gaze data 332, for instance as described with regard to FIG. 8 and FIG. 9.

At block 1208, the computing device (or one or more components thereof) may generate a second region of interest based on the first region of interest and the cluster of pixels. For example, ROI determiner 334 may determine ROI 336 based on clusters 326 and gaze data 332.

At block 1210, the computing device (or one or more components thereof) may capture, process, generate, render, or display a second image based on the second region of interest, wherein the second image has a first resolution in a first region corresponding to the second region of interest and a second resolution in a second region outside the first region and wherein the first resolution is higher than the second resolution. For example, foveated-image-data source 302 may capture, process, generate, render, or display an instance of image frame 304 based on ROI 336.

In some aspects, the second region of interest is larger than the first region of interest to include pixels of the cluster of pixels that are outside the first region of interest. For example, ROI 1004 may be larger than ROI 804 based on ROI determiner 334 generating ROI 1004 to include all of cluster 1006.

In some aspects, wherein the second region of interest does not include at least some pixels of the first region of interest based on the at least some pixels being included in a row or a column that does not include any pixels included in the cluster of pixels. For example, ROI 1104 may not include all of the pixels of ROI 804 based on ROI determiner 334 generating ROI 1104 to include pixels of cluster 1106 and to not include columns of ROI 804 that do not include pixels of cluster 1106.

In some aspects, the first region of interest comprises a rectangle positioned within the first image based on the gaze.

For example, gaze determiner 330 may determine gaze data 332 (e.g., ROI 804) as a rectangle based on the gaze.

In some aspects, the computing device (or one or more components thereof) may determine a third region of interest based on the second region of interest; wherein the second image is captured, processed, generated, rendered, or displayed further based on the third region of interest, wherein the second image has a third resolution in a third region corresponding to the third region of interest, and wherein the third resolution is higher than the second resolution. For example, ROI determiner 334 may determine ROI 402 and peripheral region 404 and foveated-image-data source 302 may capture, process, generate, render, or display image 400 including pixels at a first resolution at ROI 402, pixels at a third resolution in peripheral region 404 and pixels at a second resolution at peripheral region 406. The first resolution may be greater than the third resolution, which may be greater than the second resolution.

In some examples, as noted previously, the methods described herein (e.g., process 1200 of FIG. 12, and/or other methods described herein) can be performed, in whole or in part, by a computing device or apparatus. In one example, one or more of the methods can be performed by system 300 of FIG. 3A and/or FIG. 3B, or by another system or device. In another example, one or more of the methods (e.g., process 1200, and/or other methods described herein) can be performed, in whole or in part, by the computing-device architecture 1500 shown in FIG. 15. For instance, a computing device with the computing-device architecture 1500 shown in FIG. 15 can include, or be included in, the components of the system 300 and can implement the operations of process 1200, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 1200, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1200, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

As noted above, various aspects of the present disclosure can use machine-learning models or systems.

Figure 13:
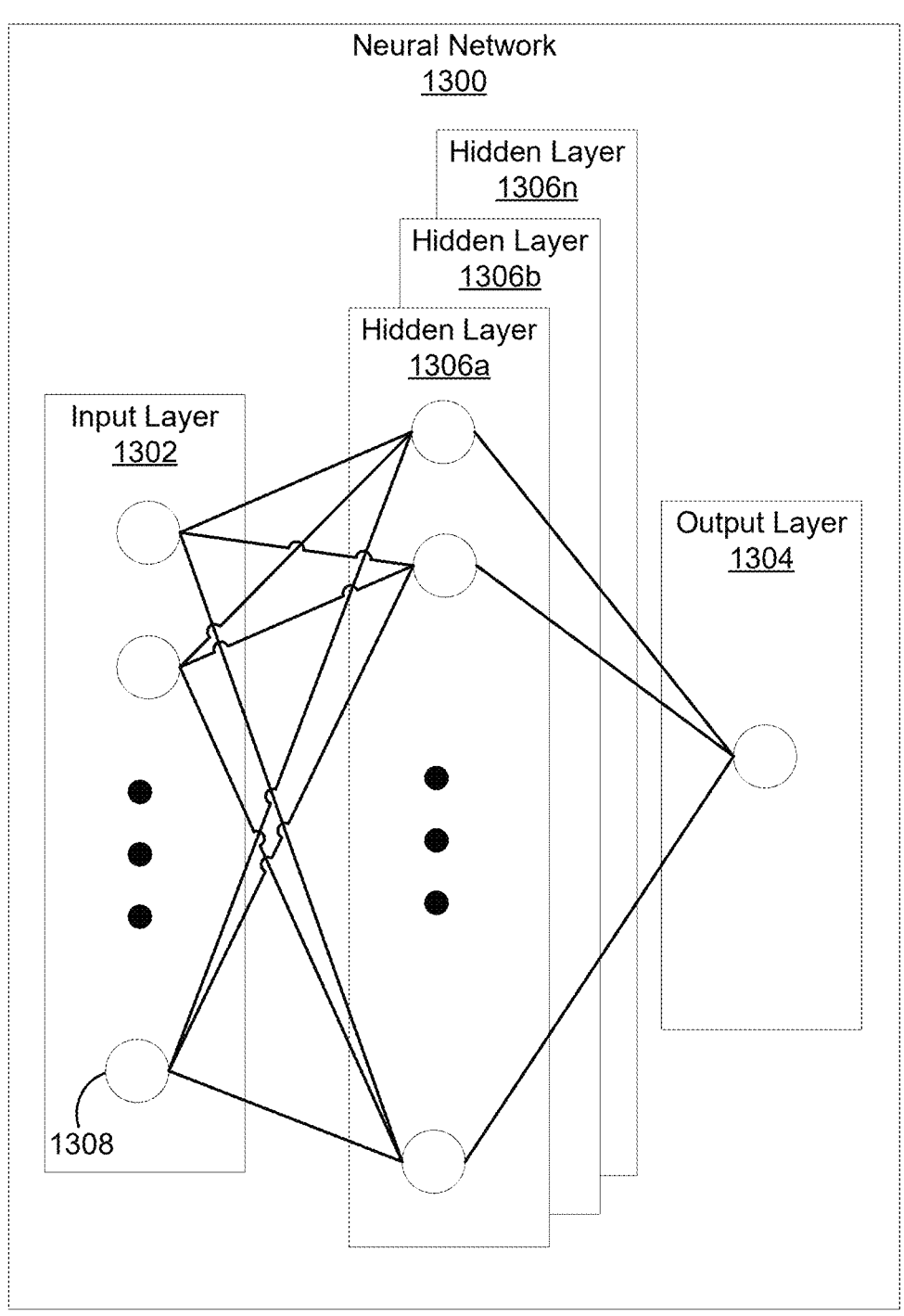
FIG. 13 is a block diagram illustrating an example of a deep learning neural network that can be used to perform various tasks, according to some aspects of the disclosed technology.

FIG. 13 is an illustrative example of a neural network 1300 (e.g., a deep-learning neural network) that can be used to implement machine-learning based image segmentation, saliency-based segmentation, implicit-neural-representation generation, rendering, classification, object detection, image recognition (e.g., face recognition, object recognition, scene recognition, etc.), feature extraction, authentication, gaze detection, gaze prediction, and/or automation. For example, neural network 1300 may be an example of, or can implement, mask generator 314 of FIG. 3A.

An input layer 1302 includes input data. In one illustrative example, input layer 1302 can include data representing processed image data 310. Neural network 1300 includes multiple hidden layers, for example, hidden layers 1306a, 1306b, through 1306n. The hidden layers 1306a, 1306b, through hidden layer 1306n include "n" number of hidden layers, where "n" is an integer greater than or equal to one. The number of hidden layers can be made to include as many layers as needed for the given application. Neural network 1300 further includes an output layer 1304 that provides an output resulting from the processing performed by the hidden layers 1306a, 1306b, through 1306n. In one illustrative example, output layer 1304 can provide mask and/or feature data 316.

Neural network 1300 may be, or may include, a multi-layer neural network of interconnected nodes. Each node can represent a piece of information. Information associated with the nodes is shared among the different layers and each layer retains information as information is processed. In some cases, neural network 1300 can include a feed-forward network, in which case there are no feedback connections where outputs of the network are fed back into itself. In some cases, neural network 1300 can include a recurrent neural network, which can have loops that allow information to be carried across nodes while reading in input.

Information can be exchanged between nodes through node-to-node interconnections between the various layers. Nodes of input layer 1302 can activate a set of nodes in the first hidden layer 1306a. For example, as shown, each of the input nodes of input layer 1302 is connected to each of the nodes of the first hidden layer 1306a. The nodes of first hidden layer 1306a can transform the information of each input node by applying activation functions to the input node information. The information derived from the transformation can then be passed to and can activate the nodes of the next hidden layer 1306b, which can perform their own designated functions. Example functions include convolutional, up-sampling, data transformation, and/or any other suitable functions. The output of the hidden layer 1306b can then activate nodes of the next hidden layer, and so on. The output of the last hidden layer 1306n can activate one or more nodes of the output layer 1304, at which an output is provided. In some cases, while nodes (e.g., node 1308) in neural network 1300 are shown as having multiple output lines, a node has a single output and all lines shown as being output from a node represent the same output value.

In some cases, each node or interconnection between nodes can have a weight that is a set of parameters derived from the training of neural network 1300. Once neural network 1300 is trained, it can be referred to as a trained neural network, which can be used to perform one or more operations. For example, an interconnection between nodes can represent a piece of information learned about the interconnected nodes. The interconnection can have a tunable numeric weight that can be tuned (e.g., based on a training dataset), allowing neural network 1300 to be adaptive to inputs and able to learn as more and more data is processed.

Neural network 1300 may be pre-trained to process the features from the data in the input layer 1302 using the different hidden layers 1306a, 1306b, through 1306n in order to provide the output through the output layer 1304. In an example in which neural network 1300 is used to identify features in images, neural network 1300 can be trained using training data that includes both images and labels, as described above. For instance, training images can be input into the network, with each training image having a label indicating the features in the images (for the feature-segmentation machine-learning system) or a label indicating classes of an activity in each image. In one example using object classification for illustrative purposes, a training image can include an image of a number 2, in which case the label for the image can be [0 0 1 0 0 0 0 0 0 0].

In some cases, neural network 1300 can adjust the weights of the nodes using a training process called backpropagation. As noted above, a backpropagation process can include a forward pass, a loss function, a backward pass, and a weight update. The forward pass, loss function, backward pass, and parameter update are performed for one training iteration. The process can be repeated for a certain number of iterations for each set of training images until neural network 1300 is trained well enough so that the weights of the layers are accurately tuned.

For the example of identifying objects in images, the forward pass can include passing a training image through neural network 1300. The weights are initially randomized before neural network 1300 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 1300, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 1300 is unable to determine low-level features and thus cannot make an accurate determination of what the classification of the object might be. A loss function can be used to analyze error in the output. Any suitable loss function definition can be used, such as a cross-entropy loss. Another example of a loss function includes the mean squared error (MSE), defined as $E_{total} = \Sigma \frac{1}{2}(target - output)^2$. The loss can be set to be equal to the value of $E_{total}$.

The loss (or error) will be high for the first training images since the actual values will be much different than the predicted output. The goal of training is to minimize the amount of loss so that the predicted output is the same as the training label. Neural network 1300 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w = w_i - \eta \, dL/dW$, where w denotes a weight, $w_i$ denotes the initial weight, and n denotes a learning rate. The learning rate can be set to any suitable value, with a high learning rate including larger weight updates and a lower value indicating smaller weight updates.

Neural network 1300 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. Neural network 1300 can include any other deep network other than a CNN, such as an autoencoder, a deep belief nets (DBNs), a Recurrent Neural Networks (RNNs), among others.

Figure 14:
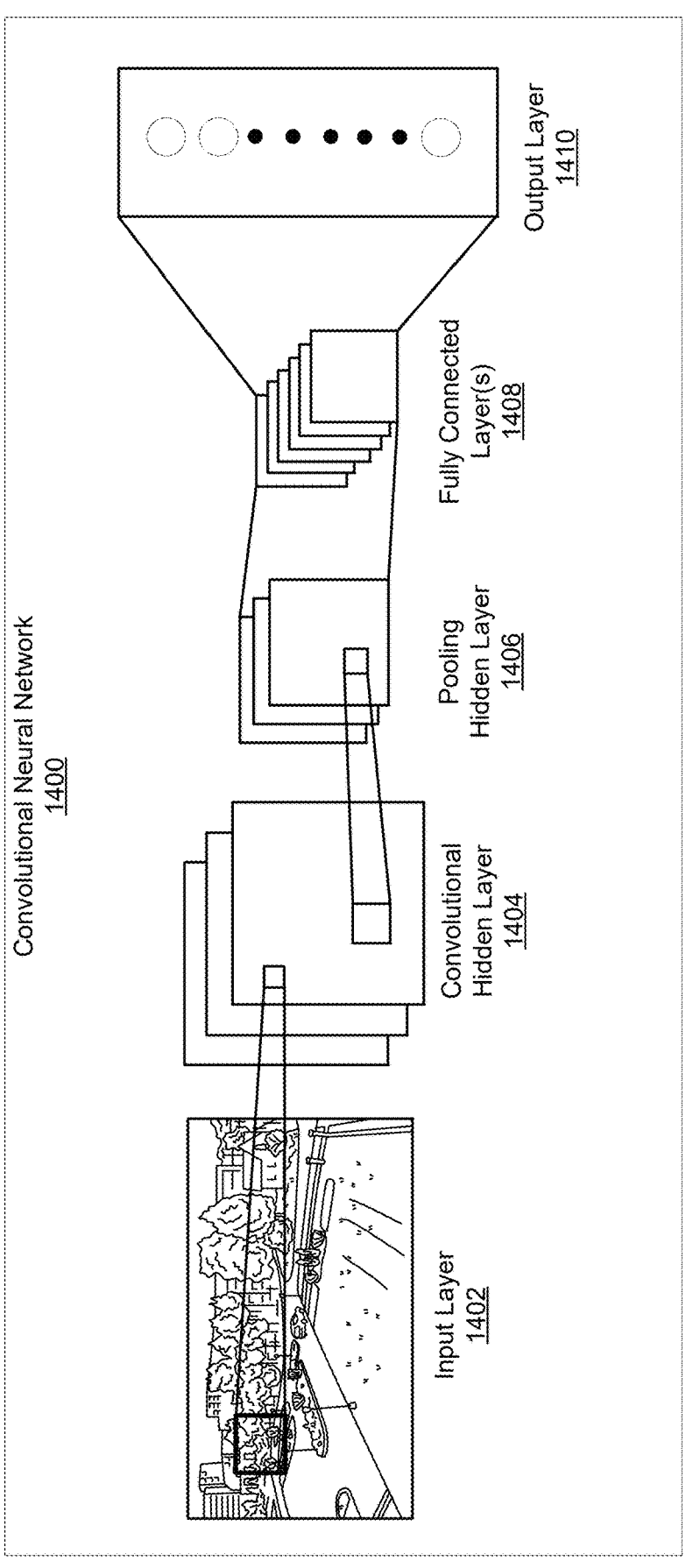
FIG. 14 is a block diagram illustrating an example of a convolutional neural network (CNN), according to various aspects of the present disclosure.

FIG. 14 is an illustrative example of a convolutional neural network (CNN) 1400. The input layer 1402 of the CNN 1400 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1404, an optional non-linear activation layer, a pooling hidden layer 1406, and fully connected layer 1408 (which fully connected layer 1408 can be hidden) to get an output at the output layer 1410. While only one of each hidden layer is shown in FIG. 14, one of ordinary skill will appreciate that multiple convolutional hidden layers, non-linear layers, pooling hidden layers, and/or fully connected layers can be included in the CNN 1400. As previously described, the output can indicate a single class of an object or can include a probability of classes that best describe the object in the image.

The first layer of the CNN 1400 can be the convolutional hidden layer 1404. The convolutional hidden layer 1404 can analyze image data of the input layer 1402. Each node of the convolutional hidden layer 1404 is connected to a region of nodes (pixels) of the input image called a receptive field. The convolutional hidden layer 1404 can be considered as one or more filters (each filter corresponding to a different activation or feature map), with each convolutional iteration of a filter being a node or neuron of the convolutional hidden layer 1404. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1404. Each connection between a node and a receptive field for that node learns a weight and, in some cases, an overall bias such that each node learns to analyze its particular local receptive field in the input image. Each node of the convolutional hidden layer 1404 will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 1404 is due to each node of the convolutional layer being applied to its corresponding receptive field. For example, a filter of the convolutional hidden layer 1404 can begin in the top-left corner of the input image array and can convolve around the input image. As noted above, each convolutional iteration of the filter can be considered a node or neuron of the convolutional hidden layer 1404. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1404. For example, a filter can be moved by a step amount (referred to as a stride) to the next receptive field. The stride can be set to 1 or any other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1404.

The mapping from the input layer to the convolutional hidden layer 1404 is referred to as an activation map (or feature map). The activation map includes a value for each node representing the filter results at each location of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1404 can include several activation maps in order to identify multiple features in an image. The example shown in FIG. 14 includes three activation maps. Using three activation maps, the convolutional hidden layer 1404 can detect three different kinds of features, with each feature being detectable across the entire image.

In some examples, a non-linear hidden layer can be applied after the convolutional hidden layer 1404. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1400 without affecting the receptive fields of the convolutional hidden layer 1404.

The pooling hidden layer 1406 can be applied after the convolutional hidden layer 1404 (and after the non-linear hidden layer when used). The pooling hidden layer 1406 is used to simplify the information in the output from the convolutional hidden layer 1404. For example, the pooling hidden layer 1406 can take each activation map output from the convolutional hidden layer 1404 and generates a condensed activation map (or feature map) using a pooling function. Max-pooling is one example of a function performed by a pooling hidden layer. Other forms of pooling functions be used by the pooling hidden layer 1406, such as average pooling, L2-norm pooling, or other suitable pooling functions. A pooling function (e.g., a max-pooling filter, an L2-norm filter, or other suitable pooling filter) is applied to each activation map included in the convolutional hidden layer 1404. In the example shown in FIG. 14, three pooling filters are used for the three activation maps in the convolutional hidden layer 1404.

In some examples, max-pooling can be used by applying a max-pooling filter (e.g., having a size of 2×2) with a stride (e.g., equal to a dimension of the filter, such as a stride of 2) to an activation map output from the convolutional hidden layer 1404. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1404 having a dimension of 24×24 nodes, the output from the pooling hidden layer 1406 will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

The pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1400.

The final layer of connections in the network is a fully-connected layer that connects every node from the pooling hidden layer 1406 to every one of the output nodes in the output layer 1410. Using the example above, the input layer includes 28×28 nodes encoding the pixel intensities of the input image, the convolutional hidden layer 1404 includes 3×24×24 hidden feature nodes based on application of a 5×5 local receptive field (for the filters) to three activation maps, and the pooling hidden layer 1406 includes a layer of 3×12×12 hidden feature nodes based on application of max-pooling filter to 2×2 regions across each of the three feature maps. Extending this example, the output layer 1410 can include ten output nodes. In such an example, every node of the 3×12×12 pooling hidden layer 1406 is connected to every node of the output layer 1410.

The fully connected layer 1408 can obtain the output of the previous pooling hidden layer 1406 (which should represent the activation maps of high-level features) and determines the features that most correlate to a particular class. For example, the fully connected layer 1408 can determine the high-level features that most strongly correlate to a particular class and can include weights (nodes) for the high-level features. A product can be computed between the weights of the fully connected layer 1408 and the pooling hidden layer 1406 to obtain probabilities for the different classes. For example, if the CNN 1400 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1410 can include an M-dimensional vector (in the prior example, M=10). M indicates the number of classes that the CNN 1400 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 15:
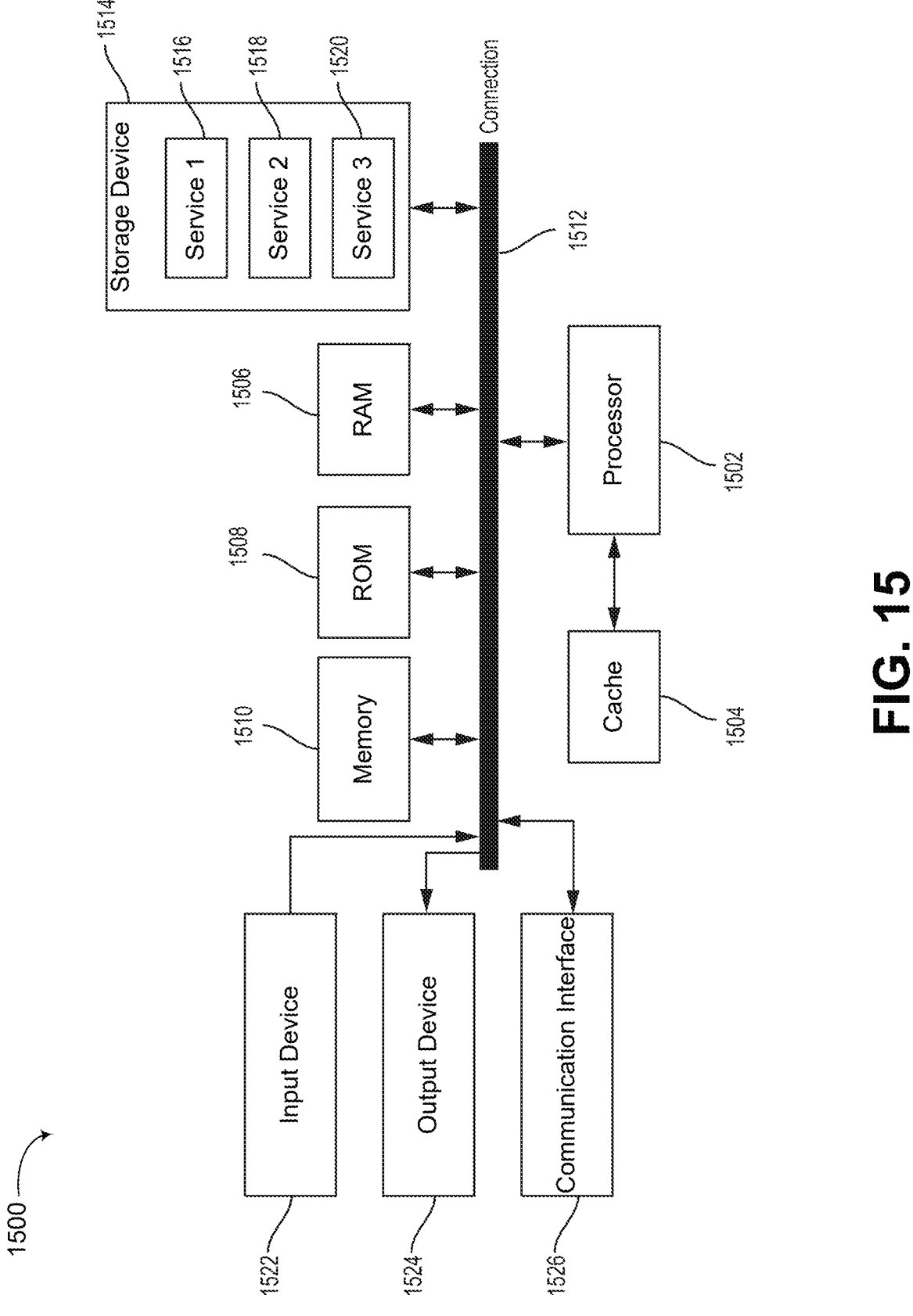
FIG. 15 is a block diagram illustrating an example computing-device architecture of an example computing device which can implement the various techniques described herein.

FIG. 15 illustrates an example computing-device architecture 1500 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1500 may include, implement, or be included in any or all of system 300 of FIG. 3A and/or FIG. 3B and/or other devices, modules, or systems described herein. Additionally or alternatively, computing-device architecture 1500 may be configured to perform process 1200, and/or other process described herein.

The components of computing-device architecture 1500 are shown in electrical communication with each other using connection 1512, such as a bus. The example computing-device architecture 1500 includes a processing unit (CPU or processor) 1502 and computing device connection 1512 that couples various computing device components including computing device memory 1510, such as read only memory (ROM) 1508 and random-access memory (RAM) 1506, to processor 1502.

Computing-device architecture 1500 can include a cache of high-speed memory connected directly with, in close proximity to, or integrated as part of processor 1502. Computing-device architecture 1500 can copy data from memory 1510 and/or the storage device 1514 to cache 1504 for quick access by processor 1502. In this way, the cache can provide a performance boost that avoids processor 1502 delays while waiting for data. These and other modules can control or be configured to control processor 1502 to perform various actions. Other computing device memory 1510 may be available for use as well. Memory 1510 can include multiple different types of memory with different performance characteristics. Processor 1502 can include any general-purpose processor and a hardware or software service, such as service 1 1516, service 2 1518, and service 3 1520 stored in storage device 1514, configured to control processor 1502 as well as a special-purpose processor where software instructions are incorporated into the processor design. Processor 1502 may be a self-contained system, containing multiple cores or processors, a bus, memory controller, cache, etc. A multi-core processor may be symmetric or asymmetric.

To enable user interaction with the computing-device architecture 1500, input device 1522 can represent any number of input mechanisms, such as a microphone for speech, a touch-sensitive screen for gesture or graphical input, keyboard, mouse, motion input, speech and so forth. Output device 1524 can also be one or more of a number of output mechanisms known to those of skill in the art, such as a display, projector, television, speaker device, etc. In some instances, multimodal computing devices can enable a user to provide multiple types of input to communicate with computing-device architecture 1500. Communication interface 1526 can generally govern and manage the user input and computing device output. There is no restriction on operating on any particular hardware arrangement and therefore the basic features here may easily be substituted for improved hardware or firmware arrangements as they are developed.

Storage device 1514 is a non-volatile memory and can be a hard disk or other types of computer readable media which can store data that are accessible by a computer, such as magnetic cassettes, flash memory cards, solid state memory devices, digital versatile discs (DVDs), cartridges, random-access memories (RAMs) 1506, read only memory (ROM) 1508, and hybrids thereof. Storage device 1514 can include services 1516, 1518, and 1520 for controlling processor 1502. Other hardware or software modules are contemplated. Storage device 1514 can be connected to the computing device connection 1512. In one aspect, a hardware module that performs a particular function can include the software component stored in a computer-readable medium in connection with the necessary hardware components, such as processor 1502, connection 1512, output device 1524, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, such as, a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for foveated imaging, the apparatus comprising: at least one memory; and at least one processor coupled to the at least one memory and configured to: determine a first region of interest within a first image based on a gaze of a user relative to the first image; cluster pixels of the first image into a one or more clusters of pixels based on a comparison of one or more characteristics of pixels of the first image; identify a cluster of pixels from among the one or more clusters of pixels based on an intersection over union of the first region of interest and the cluster of pixels; generate a second region of interest based on the first region of interest and the cluster of pixels; and capture a second image based on the second region of interest, wherein the second image has a first resolution in a first region corresponding to the second region of interest and a second resolution in a second region outside the first region and wherein the first resolution is higher than the second resolution.

Aspect 2. The apparatus of aspect 1, wherein the second region of interest is larger than the first region of interest to include pixels of the cluster of pixels that are outside the first region of interest.

Aspect 3. The apparatus of any one of aspects 1 or 2, wherein the second region of interest does not include at least some pixels of the first region of interest based on the at least some pixels being included in a row or a column that does not include any pixels included in the cluster of pixels.

Aspect 4. The apparatus of any one of aspects 1 to 3, wherein the at least one processor is configured to determine a third region of interest based on the second region of interest; wherein the second image is captured further based on the third region of interest, wherein the second image has a third resolution in a third region corresponding to the third region of interest, and wherein the third resolution is higher than the second resolution.

Aspect 5. The apparatus of any one of aspects 1 to 4, wherein the first region of interest comprises a rectangle positioned within the first image based on the gaze.

Aspect 6. The apparatus of any one of aspects 1 to 5, wherein the one or more characteristics compared to cluster the pixels of the first image into the one or more clusters comprise at least one of: a brightness of the pixels; a color of the pixels; a saliency label associated with the pixels; an object label associated with the pixels; or a depth label associated with the pixels.

Aspect 7. The apparatus of any one of aspects 1 to 6, wherein each cluster of pixels of one or more clusters of pixels comprises a cluster of blocks of pixels, wherein each cluster of pixels of the one or more clusters of pixels is determined based on a comparison the one or more characteristics of the blocks of pixels.

Aspect 8. The apparatus of aspect 7 wherein the one or more characteristics compared to cluster the pixels of the first image into the one or more clusters comprise at least one of: a sharpness of pixels of the blocks of pixels; a brightness of the pixels of the blocks of pixels; one or more colors of the pixels of the blocks of pixels; a pattern of the blocks of pixels; a saliency label associated with the blocks of pixels; an object label associated with the blocks of pixels; or a depth label associated with the blocks of pixels.

Aspect 9. The apparatus of any one of aspects 1 to 8, wherein the cluster of pixels is determined according to at least one of: a saliency-detection technique, an object-detection technique, or an image-segmentation technique.

Aspect 10. The apparatus of any one of aspects 1 to 9, wherein the intersection over union comprises an intersection of the first region of interest and the cluster of pixels divided by a union of the first region of interest and the cluster of pixels.

Aspect 11. A method for foveated imaging, the method comprising: determining a first region of interest within a first image based on a gaze of a user relative to the first image; clustering pixels of the first image into a one or more clusters of pixels based on a comparison of one or more characteristics of pixels of the first image; identifying a cluster of pixels from among the one or more clusters of pixels based on an intersection over union of the first region of interest and the cluster of pixels; generating a second region of interest based on the first region of interest and the cluster of pixels; and capturing a second image based on the second region of interest, wherein the second image has a first resolution in a first region corresponding to the second region of interest and a second resolution in a second region outside the first region and wherein the first resolution is higher than the second resolution.

Aspect 12. The method of aspect 11, wherein the second region of interest is larger than the first region of interest to include pixels of the cluster of pixels that are outside the first region of interest.

Aspect 13. The method of any one of aspects 11 or 12, wherein the second region of interest does not include at least some pixels of the first region of interest based on the at least some pixels being included in a row or a column that does not include any pixels included in the cluster of pixels.

Aspect 14. The method of any one of aspects 11 to 13, further comprising determining a third region of interest based on the second region of interest; wherein the second image is captured further based on the third region of interest, wherein the second image has a third resolution in a third region corresponding to the third region of interest, and wherein the third resolution is higher than the second resolution.

Aspect 15. The method of any one of aspects 11 to 14, wherein the first region of interest comprises a rectangle positioned within the first image based on the gaze.

Aspect 16. The method of any one of aspects 11 to 15, wherein the one or more characteristics compared to cluster the pixels of the first image into the one or more clusters comprise at least one of: a brightness of the pixels; a color of the pixels; a saliency label associated with the pixels; an object label associated with the pixels; or a depth label associated with the pixels.

Aspect 17. The method of any one of aspects 11 to 16, wherein each cluster of pixels of one or more clusters of pixels comprises a cluster of blocks of pixels, wherein each cluster of pixels of the one or more clusters of pixels is determined based on a comparison the one or more characteristics of the blocks of pixels.

Aspect 18. The method of aspect 17 wherein the one or more characteristics compared to cluster the pixels of the first image into the one or more clusters comprise at least one of: a sharpness of pixels of the blocks of pixels; a brightness of the pixels of the blocks of pixels; one or more colors of the pixels of the blocks of pixels; a pattern of the blocks of pixels; a saliency label associated with the blocks of pixels; an object label associated with the blocks of pixels; or a depth label associated with the blocks of pixels.

Aspect 19. The method of any one of aspects 11 to 18, wherein the cluster of pixels is determined according to at least one of: a saliency-detection technique, an object-detection technique, or an image-segmentation technique.

Aspect 20. The method of any one of aspects 11 to 19, wherein the intersection over union comprises an intersection of the first region of interest and the cluster of pixels divided by a union of the first region of interest and the cluster of pixels.

Aspect 21. An apparatus for foveated imaging, the apparatus comprising: at least one memory; and at least one processor coupled to the at least one memory and configured to: determine a first region of interest within a first image based on a gaze of a user relative to the first image; cluster pixels of the first image into a one or more clusters of pixels based on a comparison of one or more characteristics of pixels of the first image; identify a cluster of pixels from among the one or more clusters of pixels based on a center of the gaze of the user; generate a second region of interest based on the first region of interest and the cluster of pixels; and capture a second image based on the second region of interest, wherein the second image has a first resolution in a first region corresponding to the second region of interest and a second resolution in a second region outside the first region and wherein the first resolution is higher than the second resolution.

Aspect 22. A method for foveated imaging, the method comprising: determining a first region of interest within a first image based on a gaze of a user relative to the first image; clustering pixels of the first image into a one or more clusters of pixels based on a comparison of one or more characteristics of pixels of the first image; identifying a cluster of pixels from among the one or more clusters of pixels based on a center of the gaze of the user; generating a second region of interest based on the first region of interest and the cluster of pixels; and capturing a second image based on the second region of interest, wherein the second image has a first resolution in a first region corresponding to the second region of interest and a second resolution in a second region outside the first region and wherein the first resolution is higher than the second resolution.

Aspect 23. A non-transitory computer-readable storage medium having stored thereon instructions that, when executed by at least one processor, cause the at least one processor to perform operations according to any of aspects 11 to 20 or 22.

Aspect 24. An apparatus for providing virtual content for display, the apparatus comprising one or more means for perform operations according to any of aspects 11 to 20 or 22.

What is claimed is:

1. An apparatus for foveated imaging, the apparatus comprising:

at least one memory; and at least one processor coupled to the at least one memory and configured to:

determine a first region of interest within a first image based on a gaze of a user relative to the first image;

cluster pixels of the first image into a one or more clusters of pixels based on a comparison of one or more characteristics of pixels of the first image;

identify a cluster of pixels from among the one or more clusters of pixels based on an intersection over union of the first region of interest and the cluster of pixels;

generate a second region of interest based on the first region of interest and the cluster of pixels; and capture a second image based on the second region of interest, wherein the second image has a first resolution in a first region corresponding to the second region of interest and a second resolution in a second region outside the first region and wherein the first resolution is higher than the second resolution.

2. The apparatus of claim 1, wherein the second region of interest is larger than the first region of interest to include pixels of the cluster of pixels that are outside the first region of interest.

3. The apparatus of claim 1, wherein the second region of interest does not include at least some pixels of the first region of interest based on the at least some pixels being included in a row or a column that does not include any pixels included in the cluster of pixels.

4. The apparatus of claim 1, wherein the at least one processor is configured to determine a third region of interest based on the second region of interest; wherein the second image is captured further based on the third region of interest, wherein the second image has a third resolution in a third region corresponding to the third region of interest, and wherein the third resolution is higher than the second resolution.

5. The apparatus of claim 1, wherein the first region of interest comprises a rectangle positioned within the first image based on the gaze.

6. The apparatus of claim 1, wherein the one or more characteristics compared to cluster the pixels of the first image into the one or more clusters comprise at least one of:

a brightness of the pixels;

a color of the pixels;

a saliency label associated with the pixels;

an object label associated with the pixels; or a depth label associated with the pixels.

7. The apparatus of claim 1, wherein each cluster of pixels of one or more clusters of pixels comprises a cluster of blocks of pixels, wherein each cluster of pixels of the one or more clusters of pixels is determined based on a comparison the one or more characteristics of the blocks of pixels.

8. The apparatus of claim 7 wherein the one or more characteristics compared to cluster the pixels of the first image into the one or more clusters comprise at least one of:

a sharpness of pixels of the blocks of pixels;

a brightness of the pixels of the blocks of pixels;

one or more colors of the pixels of the blocks of pixels;

a pattern of the blocks of pixels;

a saliency label associated with the blocks of pixels;

an object label associated with the blocks of pixels; or a depth label associated with the blocks of pixels.

9. The apparatus of claim 1, wherein the cluster of pixels is determined according to at least one of:

a saliency-detection technique, an object-detection technique, or an image-segmentation technique.

10. The apparatus of claim 1, wherein the intersection over union comprises an intersection of the first region of interest and the cluster of pixels divided by a union of the first region of interest and the cluster of pixels.

11. A method for foveated imaging, the method comprising:

determining a first region of interest within a first image based on a gaze of a user relative to the first image;

clustering pixels of the first image into a one or more clusters of pixels based on a comparison of one or more characteristics of pixels of the first image;

identifying a cluster of pixels from among the one or more clusters of pixels based on an intersection over union of the first region of interest and the cluster of pixels;

generating a second region of interest based on the first region of interest and the cluster of pixels; and capturing a second image based on the second region of interest, wherein the second image has a first resolution in a first region corresponding to the second region of interest and a second resolution in a second region outside the first region and wherein the first resolution is higher than the second resolution.

12. The method of claim 11, wherein the second region of interest is larger than the first region of interest to include pixels of the cluster of pixels that are outside the first region of interest.

13. The method of claim 11, wherein the second region of interest does not include at least some pixels of the first region of interest based on the at least some pixels being included in a row or a column that does not include any pixels included in the cluster of pixels.

14. The method of claim 11, further comprising determining a third region of interest based on the second region of interest; wherein the second image is captured further based on the third region of interest, wherein the second image has a third resolution in a third region corresponding to the third region of interest, and wherein the third resolution is higher than the second resolution.

15. The method of claim 11, wherein the first region of interest comprises a rectangle positioned within the first image based on the gaze.

16. The method of claim 11, wherein the one or more characteristics compared to cluster the pixels of the first image into the one or more clusters comprise at least one of:

a brightness of the pixels;

a color of the pixels;

a saliency label associated with the pixels;

an object label associated with the pixels; or a depth label associated with the pixels.

17. The method of claim 11, wherein each cluster of pixels of one or more clusters of pixels comprises a cluster of blocks of pixels, wherein each cluster of pixels of the one or more clusters of pixels is determined based on a comparison the one or more characteristics of the blocks of pixels.

18. The method of claim 17 wherein the one or more characteristics compared to cluster the pixels of the first image into the one or more clusters comprise at least one of:

a sharpness of pixels of the blocks of pixels;

a brightness of the pixels of the blocks of pixels;

one or more colors of the pixels of the blocks of pixels;

a pattern of the blocks of pixels;

a saliency label associated with the blocks of pixels;

an object label associated with the blocks of pixels; or a depth label associated with the blocks of pixels.

19. The method of claim 11, wherein the cluster of pixels is determined according to at least one of:

a saliency-detection technique, an object-detection technique, or an image-segmentation technique.

20. The method of claim 11, wherein the intersection over union comprises an intersection of the first region of interest and the cluster of pixels divided by a union of the first region of interest and the cluster of pixels.

\* \* \* \* \*